(12) United States Patent
Furukawa et al.

(10) Patent No.: US 9,297,646 B2
(45) Date of Patent: Mar. 29, 2016

(54) MEASUREMENT METHOD AND MEASUREMENT APPARATUS

(75) Inventors: Yasunori Furukawa, Utsunomiya (JP); Toru Shimizu, Kyoto (JP)

(73) Assignee: CANON KABUSHIKI KAISHA, Tokyo (JP)

(*) Notice: Subject to any disclaimer, the term of this patent is extended or adjusted under 35 U.S.C. 154(b) by 999 days.

(21) Appl. No.: 13/316,610

(22) Filed: Dec. 12, 2011

(65) Prior Publication Data

US 2012/0158357 A1  Jun. 21, 2012

(30) Foreign Application Priority Data

Dec. 17, 2010 (JP) .................................. 2010-282395

(51) Int. Cl.
| | | |
|---|---|---|
| *G01B 9/023* | (2006.01) | |
| *G01B 11/24* | (2006.01) | |
| *G01B 11/255* | (2006.01) | |

(52) U.S. Cl.
CPC ............. *G01B 11/24* (2013.01); *G01B 11/255* (2013.01)

(58) Field of Classification Search
CPC .............. G01B 11/24–11/25; G01B 11/306; G01B 11/02; G01B 11/255; G01B 11/16; G01B 11/05; G01B 11/00; G01B 11/26; G01B 11/27; G01B 5/20
USPC ......... 356/601–613, 124, 450, 511, 512, 625; 702/167
See application file for complete search history.

(56) References Cited

U.S. PATENT DOCUMENTS

| 4,264,208 A | * | 4/1981 | Haberl et al. ................. 356/609 |
| 5,960,379 A | * | 9/1999 | Shimizu et al. ............... 702/155 |

(Continued)

FOREIGN PATENT DOCUMENTS

| CN | 101802544 A | 8/2010 |
| JP | 10-221029 A | 8/1998 |

(Continued)

OTHER PUBLICATIONS

Notification of the First Office Action for corresponding CN 201110412315.3, dated Nov. 26, 2013. English translation provided.

(Continued)

*Primary Examiner* — Gregory J Toatley
*Assistant Examiner* — Yoshihisa Ishizuka
(74) *Attorney, Agent, or Firm* — Rossi, Kimms & McDowell LLP

(57) ABSTRACT

The present invention provides a measurement method of measuring a surface shape of a measurement target surface including an aspherical surface by using a measurement apparatus including an optical system which guides a light from the measurement target surface to a detection unit having a detection surface, including a step of converting, into coordinates on the measurement target surface by using a coordinate conversion table, coordinates on the detection surface that indicate positions where light traveling from the measurement target surface enters the detection surface, and a step of converting, by using an angle conversion table, angle differences between angles of light reflected by a reference surface and angles of light reflected by the measurement target surface at the respective coordinates on the detection surface into angle differences at a plurality of respective coordinates on the measurement target surface that correspond to the respective coordinates on the detection surface.

10 Claims, 16 Drawing Sheets

(56) References Cited

U.S. PATENT DOCUMENTS

| | | | |
|---|---|---|---|
| 6,100,980 A * | 8/2000 | Ichikawa | 356/511 |
| 6,771,375 B2 * | 8/2004 | Zanoni | 356/512 |
| 7,907,262 B2 * | 3/2011 | Scott et al. | 356/124 |
| 7,969,585 B2 * | 6/2011 | Neal et al. | 356/625 |
| 8,314,939 B2 * | 11/2012 | Kato | 356/608 |
| 8,675,206 B2 * | 3/2014 | Osaki | 356/511 |
| 8,692,999 B1 * | 4/2014 | Olczak | 356/450 |
| 2002/0080366 A1 * | 6/2002 | Nakayama | 356/512 |
| 2002/0082804 A1 * | 6/2002 | Sakai | 702/167 |
| 2003/0038921 A1 * | 2/2003 | Neal et al. | 351/212 |
| 2005/0030406 A1 * | 2/2005 | Yoshikawa | 348/335 |
| 2009/0034076 A1 * | 2/2009 | Suzui et al. | 359/557 |
| 2010/0177320 A1 * | 7/2010 | Arnold et al. | 356/512 |
| 2010/0209832 A1 | 8/2010 | Matsuda | |
| 2011/0063691 A1 * | 3/2011 | Shimomura | 358/474 |
| 2011/0141484 A1 * | 6/2011 | Arnold et al. | 356/512 |
| 2012/0158359 A1 * | 6/2012 | Nakajima | 702/168 |

FOREIGN PATENT DOCUMENTS

| | | |
|---|---|---|
| JP | 10-281736 A | 10/1998 |
| JP | 2000-97663 A | 4/2000 |
| TW | 200930975 A | 7/2009 |
| TW | 200947142 A | 11/2009 |

OTHER PUBLICATIONS

Johannes Pfund et al.; "Non-null testing of aspherical surfaces by using a Shack-Hartmann sensor"; 1999 Optical Society of America; pp. 112/OTuC5-1-114/OTuC5-3.

\* cited by examiner

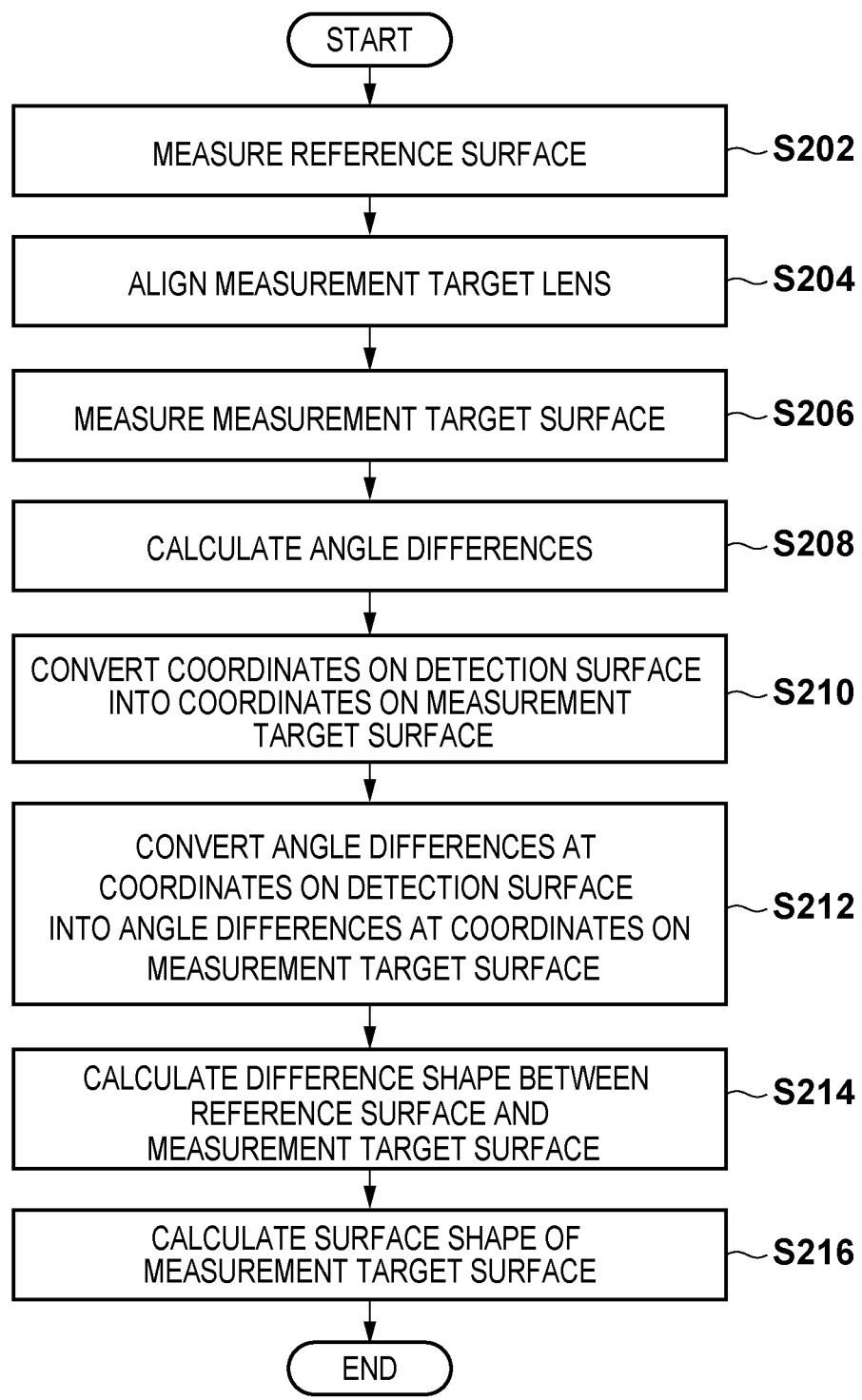

F I G. 14
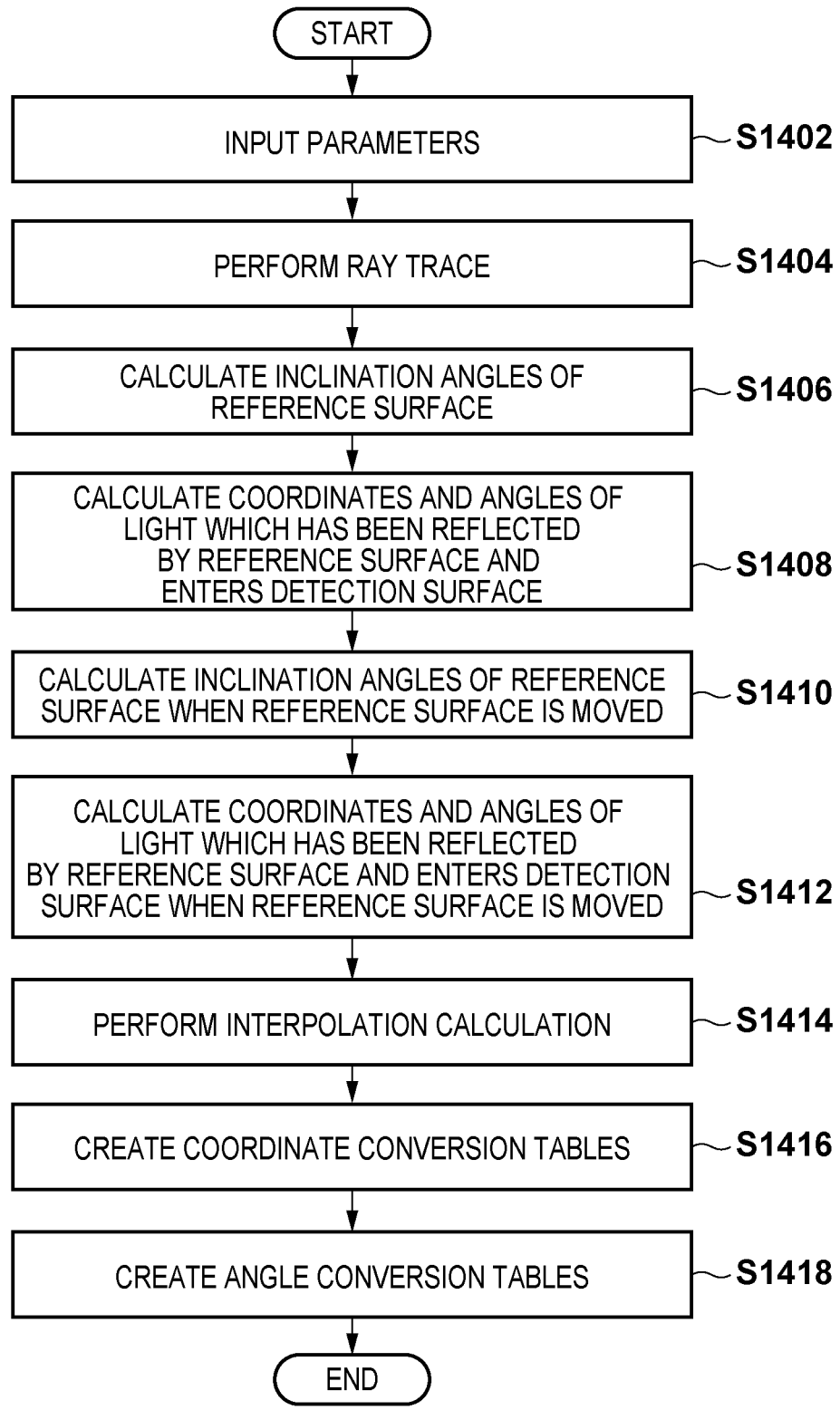

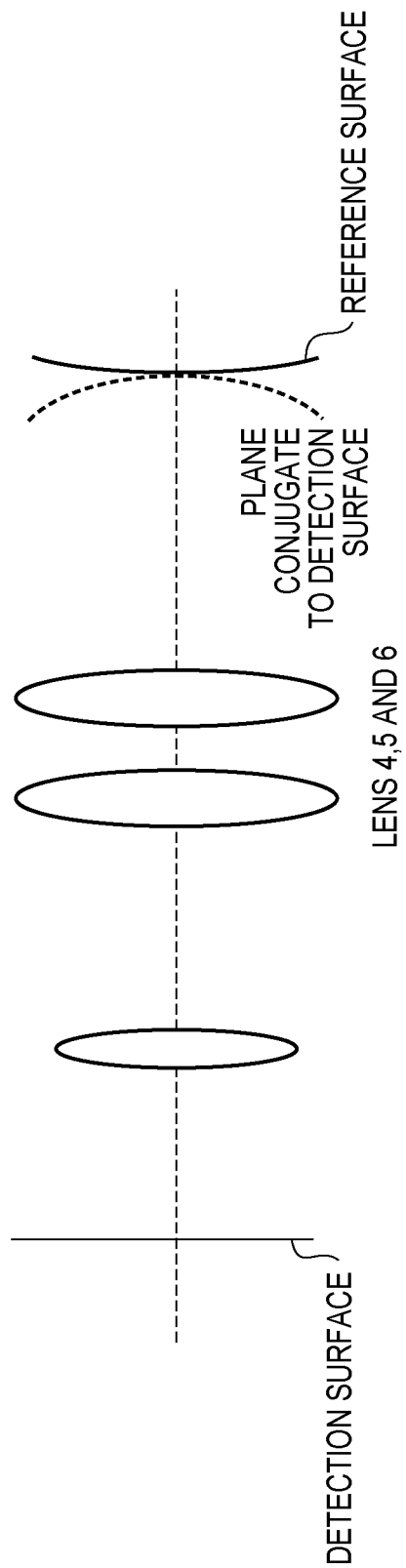

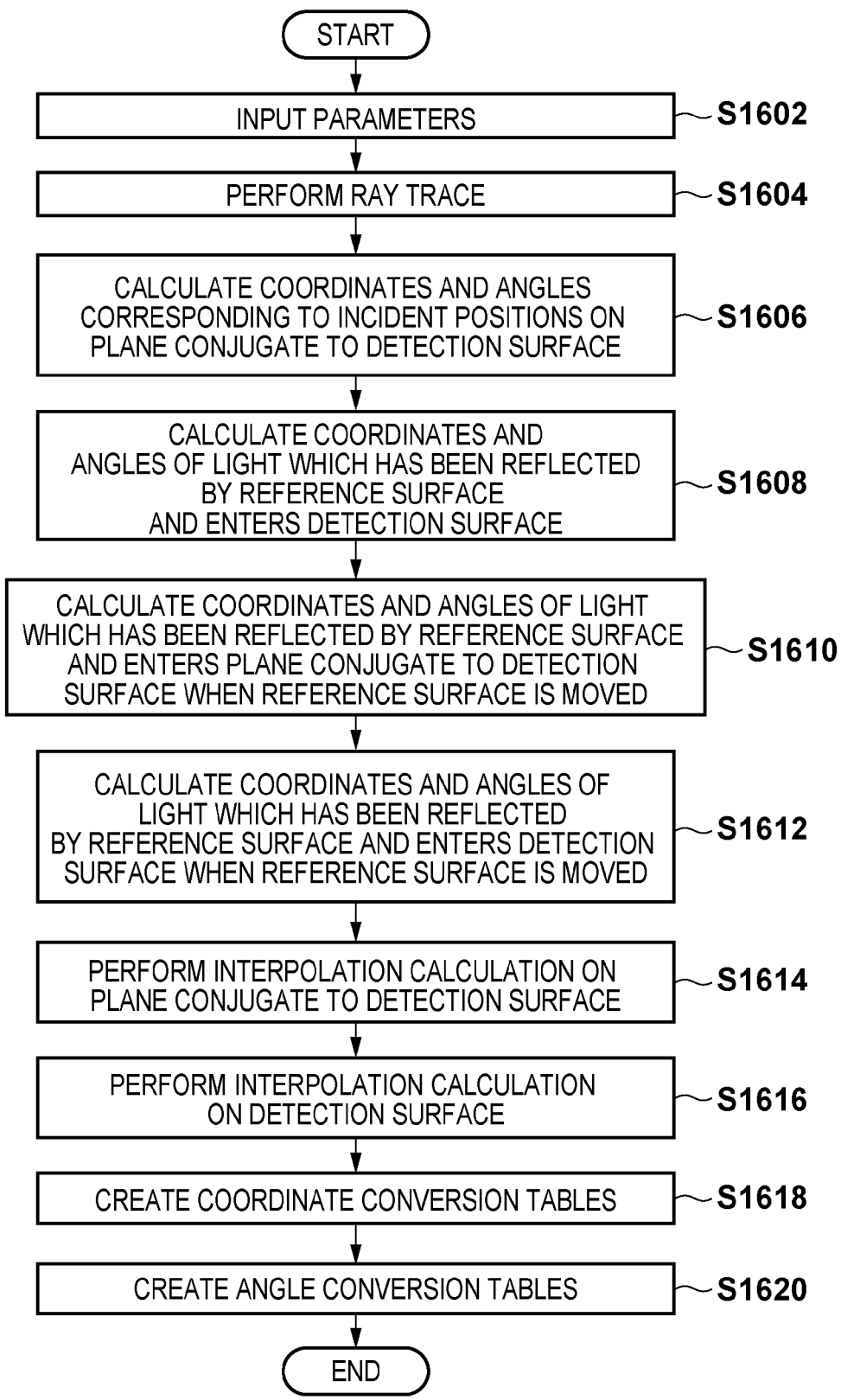

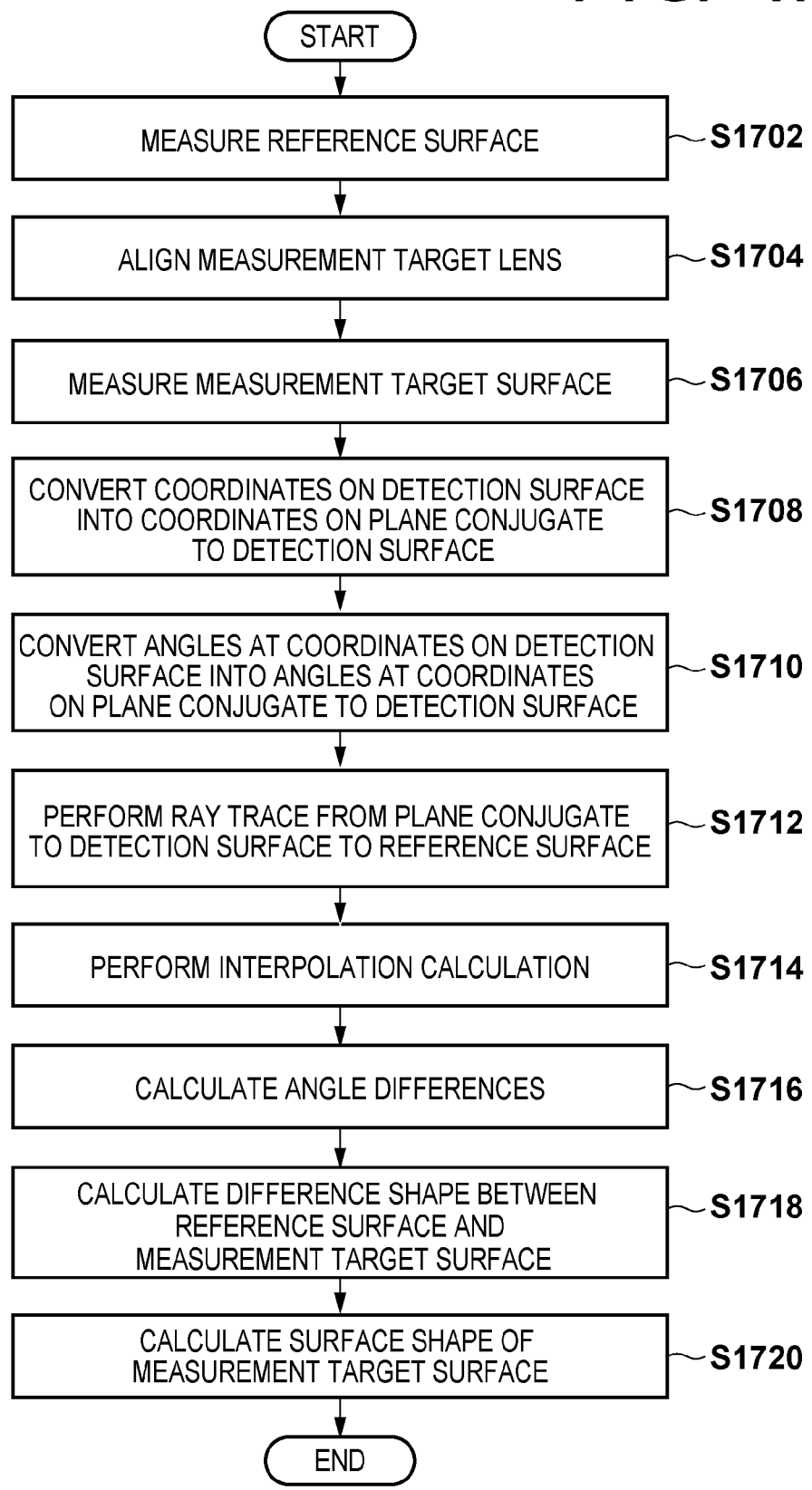

MEASUREMENT METHOD AND MEASUREMENT APPARATUS

BACKGROUND OF THE INVENTION

1. Field of the Invention

The present invention relates to a measurement method and measurement apparatus for measuring the surface shape of a measurement target surface including an aspherical surface.

2. Description of the Related Art

As a technique of measuring the shape (surface shape) of a measurement target surface such as an aspherical lens in a non-contact manner, there is known a method using an interferometer (for example, Fizeau interferometer) with a null lens. In this method, light having a wavefront (null wavefront) corresponding to the design shape of a measurement target surface is formed via the null lens. Light (measurement light) reflected by the measurement target surface and reference light are made to interfere with each other. The difference between the wavefront of the measurement light and that of the reference light is measured, obtaining the shape of the measurement target surface. To obtain the shape of the measurement target surface at high accuracy, a measurement system error (error arising from the interferometer) needs to be calibrated at high accuracy. For example, Japanese Patent Laid-Open Nos. 10-221029, 2000-97663, and 10-281736 propose techniques regarding calibration of the null wavefront, calibration of the distortion, calibration of the magnification, and the like.

As a method of measuring the shape of a measurement target surface without using the null lens, there is also known a method using a Shack-Hartmann sensor with a large dynamic range of a measurement wavefront for a detection unit (see Johannes Pfund et. al., "Non-null testing of aspherical surfaces by using a Shack-Hartmann sensor", "OSA", (US), 2000, OTuC5, pp. 112-114). This method irradiates a measurement target surface with light of a spherical wave via a projection optical system.

However, in the method using a null lens, the measurement accuracy depends on the manufacturing accuracy of the null lens. Implementation of high measurement accuracy requires a long time and high cost in the manufacture of a null lens. Further, this method has other problems such that a different null lens needs to be prepared for each shape of a measurement target surface and calibration of the measurement system error becomes complicated.

In the method using no null lens, a measurement system error such as an alignment error or aberration exists in the projection optical system. Even if the detection unit can detect light (measurement light) reflected by a measurement target surface, it is difficult to separate the shape error of the measurement target surface from the measurement system error. When the measurement target surface is aspherical, light cannot perpendicularly irradiate the measurement target surface, and the incident ray angle differs from the reflected ray angle. The measurement light does not become almost parallel rays in the detection unit (because the position magnification and angle magnification of the measurement light are not constant). The measurement light is detected to have a wavefront greatly deviated from a plane wavefront, decreasing the measurement accuracy.

SUMMARY OF THE INVENTION

The present invention provides a technique advantageous to measurement of a measurement target surface including an aspherical surface.

According to one aspect of the present invention, there is provided a measurement method of measuring a surface shape of a measurement target surface using a measurement apparatus including a first optical system which illuminates the measurement target surface including an aspherical surface by using light emitted by a light source, and a second optical system which guides the light traveling from the measurement target surface to a detection unit having a detection surface, including a first step of arranging a reference surface having a known aspherical shape on a plane conjugate to the detection surface and detecting, by the detection unit at respective coordinates on the detection surface, angles of light traveling from the reference surface at which the light enters the detection surface, a second step of arranging the measurement target surface on the conjugate plane and detecting, by the detection unit at the respective coordinates on the detection surface, angles of light traveling from the measurement target surface at which the light enters the detection surface, a third step of converting, into coordinates on the measurement target surface by using a coordinate conversion table, coordinates on the detection surface that indicate positions where light traveling from the measurement target surface enters the detection surface, a fourth step of converting, by using an angle conversion table, angle differences between the angles detected in the first step and the angles detected in the second step at the respective coordinates on the detection surface into angle differences at a plurality of respective coordinates on the measurement target surface that correspond to the respective coordinates on the detection surface, and a fifth step of obtaining a difference shape between the surface shape of the measurement target surface and the known aspherical shape by integral calculation using the coordinates on the measurement target surface that have been converted in the third step and the angle differences at the plurality of coordinates on the measurement target surface that have been converted in the fourth step, and adding the difference shape to the known aspherical shape to calculate the surface shape of the measurement target surface.

Further aspects of the present invention will become apparent from the following description of exemplary embodiments with reference to the attached drawings.

BRIEF DESCRIPTION OF THE DRAWINGS

FIG. 2 is a flowchart for explaining measurement processing in the first embodiment.

FIG. 14 is a flowchart for explaining creation of a coordinate conversion table and angle conversion table in the fourth embodiment.

FIG. 15 is a schematic view exemplifying the positional relationship between the position of a plane conjugate to the detection surface of the detection unit of the measurement apparatus shown in FIG. 1 and the position of a measurement target surface (reference surface).

FIG. 16 is a flowchart for explaining creation of a coordinate conversion table and angle conversion table in the fifth embodiment.

FIG. 17 is a flowchart for explaining measurement processing in the fifth embodiment.

DESCRIPTION OF THE EMBODIMENTS

Figure 1:
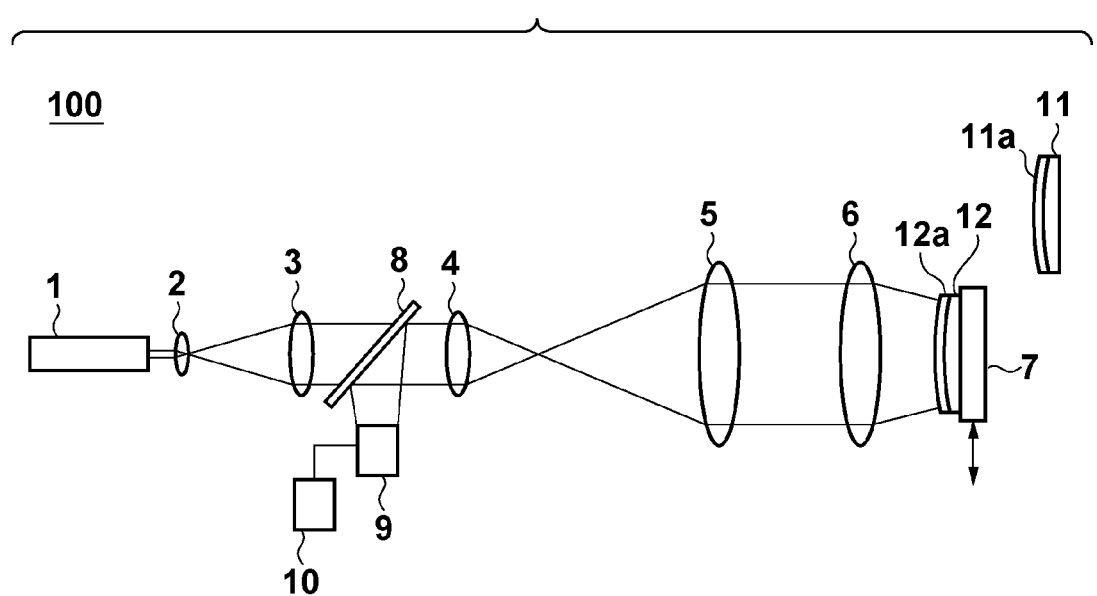
FIG. 1 is a schematic view showing the arrangement of a measurement apparatus according to an aspect of the present invention.

Preferred embodiments of the present invention will be described below with reference to the accompanying drawings. Note that the same reference numerals denote the same members throughout the drawings, and a repetitive description thereof will not be given.

FIG. 1 is a schematic view showing the arrangement of a measurement apparatus 100 according to an aspect of the present invention. The measurement apparatus 100 measures the shape of a measurement target lens 12, that is, the surface shape of a measurement target surface 12a including an aspherical surface by using a reference lens 11 including a reference surface 11a. As shown in FIG. 1, the measurement apparatus 100 includes a light source 1, collimator lenses 2 and 3, lenses 4, 5, and 6, a stage 7, a half mirror 8, a detection unit 9 having a detection surface, and a processing unit 10.

In the measurement apparatus 100, the collimator lenses 2 and 3, and the lenses 4, 5, and 6 form an optical system (first optical system) which illuminates the reference surface 11a and measurement target surface 12a using light emitted by the light source 1. The lenses 4, 5, and 6 and the half mirror 8 form an optical system (second optical system) which guides, to the detection unit 9, light traveling from the measurement target surface 12a. The stage 7 moves the reference lens 11 (reference surface 11a) and the measurement target lens 12 (measurement target surface 12a) (shifts them within a plane perpendicular to the optical axis or tilts them within a plane perpendicular to the optical axis).

Light emitted by the light source 1 is enlarged via the collimator lens 2, formed into parallel rays via the collimator lens 3, and passes through the half mirror 8. The light having passed through the half mirror 8 is enlarged via the lenses 4 and 5 and formed into convergent light via the lens 6. The convergent light is reflected by the reference surface 11a or measurement target surface 12a. The reflected light passes through the lenses 6, 5, and 4, is reflected by the half mirror 8, and enters the detection unit 9.

The light source 1 uses, for example, a single-color laser or laser diode. The focal distances and effective diameters (diameters) of the lenses 4, 5, and 6 are determined by the effective diameter and curvature radius of the measurement target surface 12a and the size (dimensions) of the detection surface of the detection unit 9.

The distance between the lens 6 and the measurement target lens 12 is set so that light having passed through the lens 6 converges at the center of curvature of a paraxial region on the measurement target surface 12a. Light emitted by the light source 1 almost perpendicularly enters measurement target surface 12a. However, the angle of light reflected by the measurement target surface 12a depends on the aspherical amount (deviation from the spherical surface) and shape error of the measurement target surface 12a. When the aspherical amount of the measurement target surface 12a is large, the angle of light reflected by the measurement target surface 12a greatly differs from the angle of light incident on the measurement target surface 12a.

The detection unit 9 is formed from a Shack-Hartmann sensor. The detection unit 9 has a detection surface made up of a microlens array having many small condenser lenses arrayed in a matrix, and a light-receiving sensor typified by a CCD sensor. In the detection unit 9, light having passed through the small condenser lens is converged on the light-receiving sensor for each small condenser lens. The angle (angle distribution) of light entering the detection unit 9 (detection surface) is obtained by detecting the difference between the position of a spot formed by the small condenser lens (microlens array) and a position calibrated in advance, for example, a spot position when parallel rays enter the detection unit 9. When the dimensions of light to be detected by the detection unit 9 are larger than those of the detection surface, the detection unit 9 moves within the detection surface to detect a ray angle and connect detected ray angles. The detection surface of the detection unit 9 and the measurement target surface 12a are arranged at positions conjugate to each other. Note that the detection unit 9 is not limited to a Shack-Hartmann sensor and suffices to be a sensor capable of detecting a wavefront or angle (distribution). For example, the detection unit 9 may be a shearing interferometer or Talbot interferometer using a diffraction grating and CCD sensor.

The processing unit 10 includes a CPU and memory, and performs processing (measurement processing) for obtaining the surface shape of the measurement target surface 12a based on the detection result of the detection unit 9. The processing unit 10 also functions as a control unit which controls the overall arrangement (operation) of the measurement apparatus 100.

The reference lens 11 is manufactured with the same design values as those of the measurement target lens 12. Note that the reference surface 11a of the reference lens 11 is measured at high accuracy by another measurement apparatus such as a probe measurement apparatus different from the measurement apparatus 100. The processing unit 10 stores the surface shape of the reference surface 11a.

The following embodiments will explain measurement processing for the surface shape of the measurement target surface 12a by the measurement apparatus 100. In the embodiments, (x, y) are absolute coordinates on a plane perpendicular to the optical axis of the reference surface 11a arranged in the measurement apparatus 100.

First Embodiment

Figure 3A:
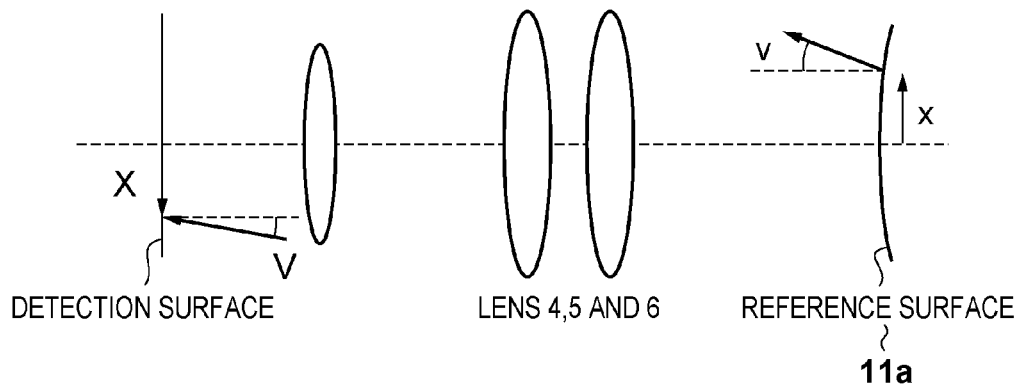
FIGS. 3A and 3B are views for explaining step S202 in FIG. 2.

FIG. 2 is a flowchart for explaining measurement processing by a measurement apparatus 100 in the first embodiment. Referring to FIG. 2, a reference surface 11a is measured in step S202. More specifically, the reference surface 11a having a known aspherical shape is arranged on a plane conjugate to the detection surface of a detection unit 9, and the angles (Vbx, Vby) of light reflected by the reference surface 11a are detected at respective coordinates (X, Y) on the detection surface of the detection unit 9. As shown in FIG. 3A, V is a ray angle detected on the detection surface of the detection unit 9. Vx and Vy are angles shown in FIG. 3B, and are the X and Y components of the ray angle V measured on the detection surface of the detection unit 9. b is a suffix indicating measurement of the reference surface 11a. The coordinates (X, Y) on the detection surface of the detection unit 9 correspond to a microlens position.

In step S204, a measurement target lens 12 is aligned. More specifically, the measurement target lens 12 is arranged in the measurement apparatus 100 in place of a reference lens 11. While the detection unit 9 detects the angle of light reflected by a measurement target surface 12a, the position of the measurement target lens 12 is adjusted to minimize the difference between the angle of light reflected by the measurement target surface 12a and that of light reflected by the reference surface 11a. Hence, the measurement target surface 12a of the measurement target lens 12 is arranged on the plane conjugate to the detection surface of the detection unit 9.

In step S206, the measurement target surface 12a is measured. More specifically, the angles (Vsx, Vsy) of light reflected by the measurement target surface 12a are detected at a plurality of coordinates (X, Y) on the detection surface of the detection unit 9.

In step S208, a processing unit 10 calculates angle differences $(\Delta Vx, \Delta Vy) = (Vsx - Vbx, Vsy - Vby)$ between the angles detected in step S202 (angles of light reflected by the reference surface 11a) and the angles detected in step S206 (angles of light reflected by the measurement target surface 12a).

In step S208, the processing unit 10 may calculate the inclination difference between the reference surface 11a and the measurement target surface 12a in accordance with equations (1):

$$\Delta Vx = \arctan(\tan(Vsx) - \tan(Vbx))$$
$$\Delta Vy = \arctan(\tan(Vsy) - \tan(Vby)) \quad (1)$$

As will be described later, the average of angles detected by the detection unit 9 when the reference surface 11a is rotated n times may be used as (Vbx, Vby), and the difference between the (Vbx, Vby) and (Vsx, Vsy) may be calculated. Alternatively, it is also possible to define light having an angle detected by the detection unit 9 as a vector, obtain the difference between vector components, and calculate angle differences along the x-axis and y-axis from the vector component difference.

In step S210, the coordinates (X, Y) on the detection surface of the detection unit 9 are converted into coordinates (x, y) on the measurement target surface by using coordinate conversion tables. In other words, coordinates on the detection surface that indicate a position where light reflected by the measurement target surface 12a enters the detection surface of the detection unit 9 are converted into coordinates on the measurement target surface.

Figure 4:
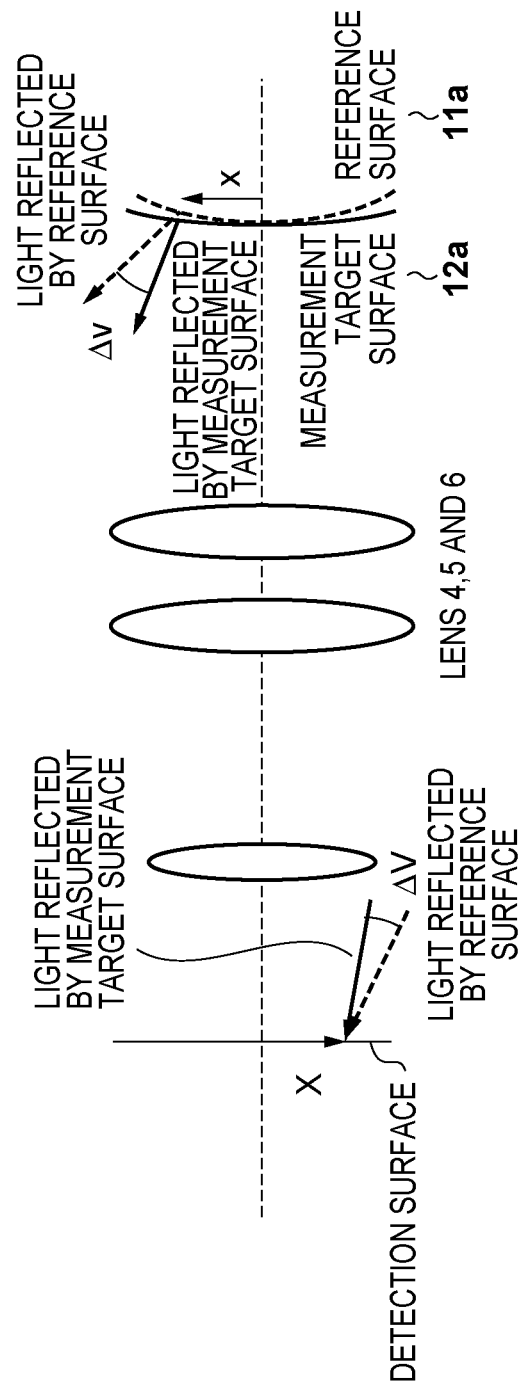
FIG. 4 is a view for explaining steps S210 and S212 in FIG. 2.

In step S212, the angle differences $(\Delta Vx, \Delta Vy)$ at the coordinates (X, Y) on the detection surface of the detection unit 9 are converted into angle differences $(\Delta vx, \Delta vy)$ at corresponding coordinates (x, y) on the measurement target surface by using angle conversion tables. $(\Delta Vx, \Delta Vy)$ and $(\Delta vx, \Delta vy)$ are the x and y components of the angle differences between light reflected by the reference surface 11a and light reflected by the measurement target surface 12a, as shown in FIG. 4.

Figure 5:
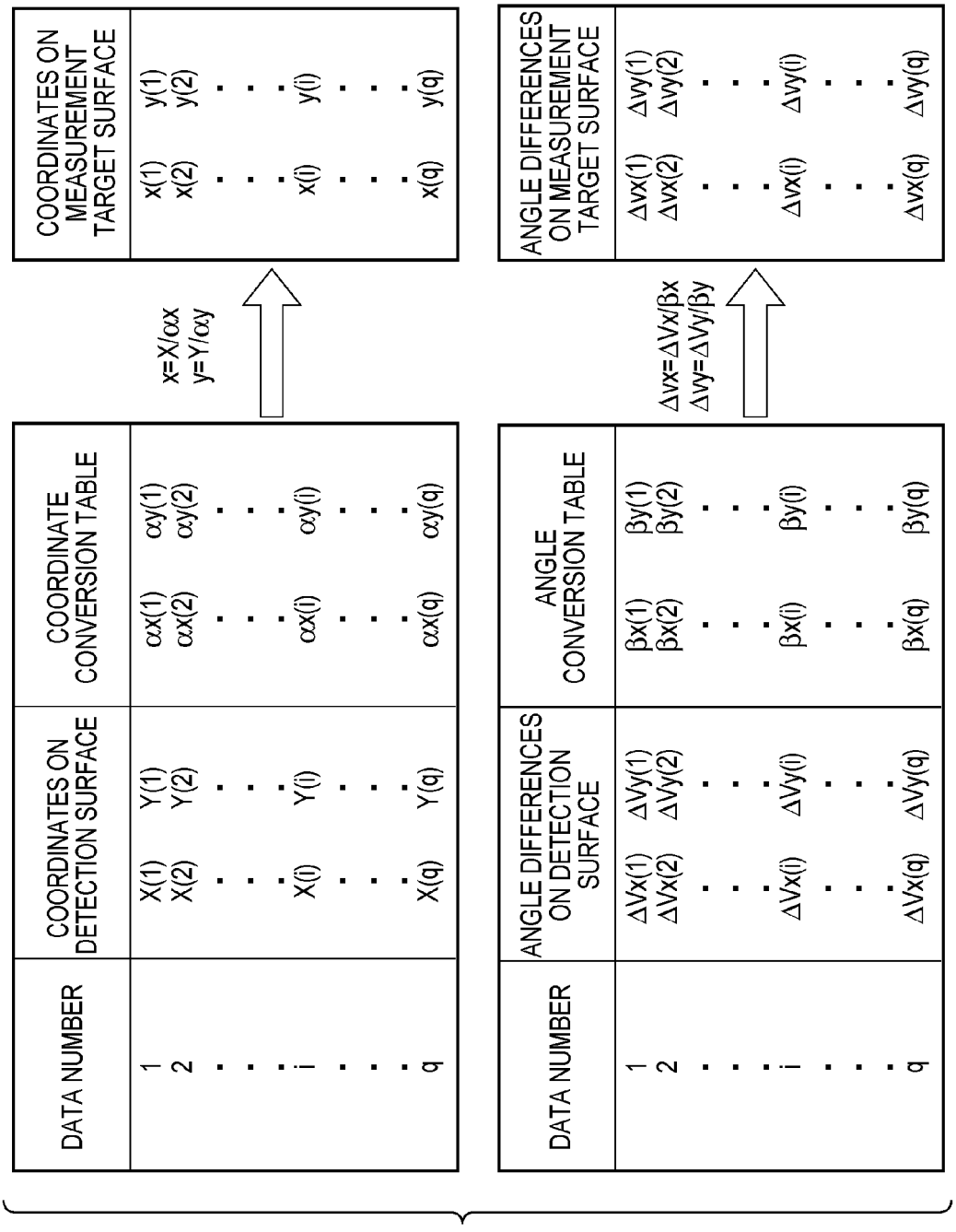
FIG. 5 is a view for explaining a coordinate conversion table and angle conversion table.

FIG. 5 is a view for explaining the coordinate conversion table and angle conversion table. FIG. 5 schematically shows coordinate conversion processing in step S210 and angle conversion processing in step S212. Referring to FIG. 5, coordinates (X(i), Y(i)) on the detection surface are converted into coordinates (x(i), y(i)) on the measurement target surface by using coordinate conversion tables $\alpha x(i)$ and $\alpha y(i)$. Also, angle differences $(\Delta Vx(i), \Delta Vy(i))$ at the coordinates (X(i), Y(i)) on the detection surface are converted into angle differences $(\Delta vx(i), \Delta vy(i))$ at the coordinates (x(i), y(i)) on the measurement target surface by using angle conversion tables $\beta x(i)$ and $\beta y(i)$. In this case, i is an integer of 1 to q. q is the number of data obtained by one measurement of the reference surface 11a, and is equal to the number of microlenses which form the detection unit 9.

In step S214, the processing unit 10 calculates the difference shape between the reference surface 11a and the measurement target surface 12a, that is, the difference shape between the known aspherical shape of the reference surface 11a and the surface shape of the measurement target surface 12a. The difference shape between the reference surface 11a and the measurement target surface 12a can be obtained by integral calculation using the coordinates (x, y) on the measurement target surface and the angle differences $(\Delta vx, \Delta vy)$ at the coordinates (x, y) on the measurement target surface. Note that integral calculation is, for example, a method in which areas obtained from the coordinate interval and angle differences are added outward from the vicinity of the center of the plane. There is also a method of performing fitting for inclination differences $(\tan(\Delta vx), \tan(\Delta vy))$ using the differential function of a basis function including sampling of the coordinates (x, y) on the measurement target surface, and multiplying the obtained coefficient and the basis function.

In step S216, the processing unit 10 calculates the surface shape of the measurement target surface 12a. The surface shape of the measurement target surface 12a can be obtained by adding the difference shape calculated in step S214 to the known aspherical shape of the reference surface 11a.

In this way, according to the first embodiment, coordinates on the detection surface of the detection unit 9 are converted into those on the measurement target surface, and angles at coordinates on the detection surface are converted into those at corresponding coordinates on the measurement target surface. Even when the measurement target surface 12a is aspherical, the measurement apparatus 100 can measure the surface shape of the measurement target surface 12a at high accuracy.

Figure 6:
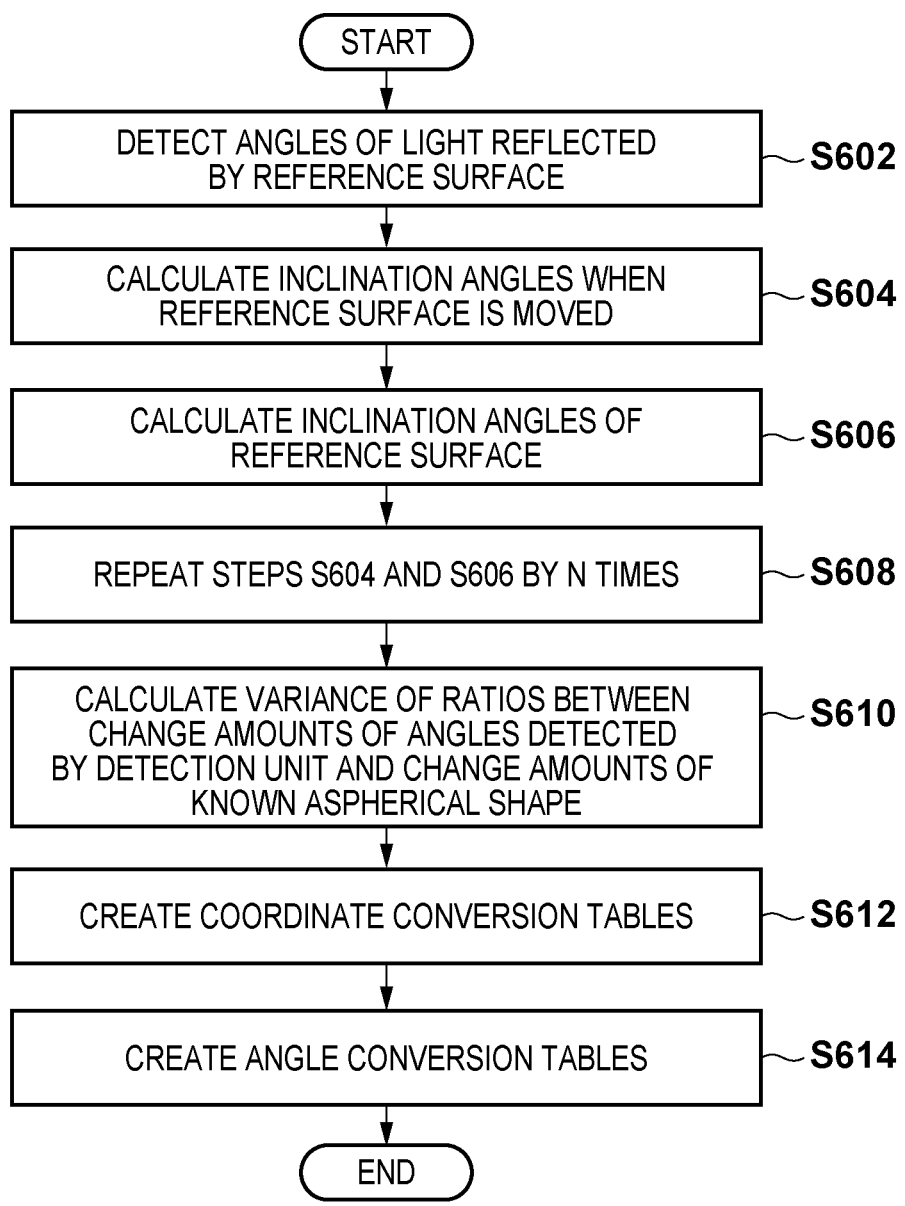
FIG. 6 is a flowchart for explaining creation of the coordinate conversion table used in step S210 of FIG. 2 and the angle conversion table used in step S212.

Creation of the coordinate conversion table used in step S210 and the angle conversion table used in step S212 will be explained with reference to FIG. 6. In general, the coordinate conversion table and angle conversion table are equivalent to the position magnification and angle magnification of a lens, and are used to be constant in the entire field of view. However, when the measurement target surface includes an aspherical surface, the position magnification and angle magnification of a lens are not constant in the entire field of view. For this reason, the embodiment adopts the coordinate conversion table and angle conversion table to correct the position magnification and angle magnification of a lens.

In step S602, the reference surface 11a is arranged on a plane conjugate to the detection surface of the detection unit 9, and the angles (Vxm, Vym) of light reflected by the reference surface 11a are detected at respective coordinates (X(i), Y(i)) on the detection surface of the detection unit 9. m is an integer of 1 to n. n is the number of times by which the reference lens 11 moves.

In step S604, the stage 7 positions the reference surface 11a at a position moved by known amounts (Δxm, Δym) from the plane conjugate to the detection surface of the detection unit 9. Then, the angles of light reflected by the reference surface 11a are detected at respective coordinates on the detection surface of the detection unit 9. Note that displacements in a direction perpendicular to the optical axis may be measured by a displacement gauge at a plurality of measurement points set in advance on the reference surface, and the measurement values may be used as (Δxm, Δym). The embodiment assumes that the reference surface 11a is moved within a plane perpendicular to the optical axis. However, the reference surface 11a may be tilted or shifted along the optical axis.

In step S606, the inclination angles of the reference surface 11a are calculated. More specifically, values obtained by differentiating, for x and y, the surface shape (known aspherical shape) of the reference surface 11a at coordinates (x, y) are defined as Qx(x, y) and Qy(x, y). In this case, when the reference surface 11a is moved by known amounts (Δxm, Δym), values obtained by differentiating the surface shape of the reference surface 11a for x and y become Qx(x-Δxm, y-Δym) and Qy(x-Δxm, y-Δym). From this, an x inclination angle vxm and y inclination angle vym when the reference surface 11a is moved by the known amounts (Δxm, Δym) can be calculated by equations (2):

$$vxm(x,y)=2\times\arctan(Qx(x-\Delta xm, y-\Delta ym))$$

$$vym(x,y)=2\times\arctan(Qy(x-\Delta xm, y-\Delta ym)) \quad (2)$$

In equations (2), arctan(Qx(x-Δxm, y-Δym)) and arctan(Qy(x-Δxm, y-Δym)) are doubled. This is because when light emitted by a light source 1 is reflected by the reference surface 11a, the change amount of the reflection angle becomes double the change amount of the inclination angle of the reference surface 11a.

In step S608, steps S604 and S606 are repeated n times. Accordingly, the reference surface 11a is positioned at a plurality of positions by moving it by the known amount from the plane conjugate to the detection surface of the detection unit 9. At each of these positions, the angle of light reflected by the reference surface 11a is detected at respective coordinates on the detection surface of the detection unit 9.

In step S610, the variance (dispersion) of ratios between change amounts of angles detected by the detection unit 9 before and after positioning the reference surface 11a at respective positions and change amounts of the known aspherical shape before and after moving the reference surface 11a by the known amount is calculated. More specifically, the following equations (3) and (4) are solved using the angles (Vxm, Vym) of light reflected by the reference surface 11a, and the x inclination angle vxm and y inclination angle vym of the reference surface 11a:

$$rxmij=(Vxm(X(i),Y(i))-\text{Ave}(Vxm(X(i),Y(i))))/(vxm(x(j),y(j))-\text{Ave}(vxm(x(j),y(j))))$$

$$rxmij=(Vym(X(i),Y(i))-\text{Ave}(Vym(X(i),Y(i))))/(vym(x(j),y(j))-\text{Ave}(vym(x(j),y(j)))) \quad (3)$$

$$\sigma ij=1/n\times\Sigma((rxmij-\text{Ave}(rxmij))^2+(rymij-\text{Ave}(rymij))^2) \quad (4)$$

Ave( ) means that average calculation is performed for m with respect to a value in ( ) (x(j), y(j)) is the sampling position of the surface shape (data) of the reference surface 11a that is measured by a measurement apparatus different from the measurement apparatus 100. j is an integer of 1 to p, and p is the total number of sampling positions. rxmij and rymij are values obtained by dividing the change amounts of angles at the coordinates (X(i), Y(i)) on the detection surface of the detection unit 9 by the change amounts of the inclination angles of the reference surface 11a at the coordinates (x(j), y(j)) on the reference surface when the reference surface 11a is moved. σij is the sum of variances of rxmij and rymij obtained by repeating steps S604 and S606 by n times.

Instead of solving equations (3) and (4), equations (5) and (6) may be solved:

$$rxmij=(\tan(Vxm(X(i),Y(i)))-\text{Ave}(\tan(Vxm(X(i),Y(i)))))/(\tan(vxm(x(j),y(j)))-\text{Ave}(\tan(vxm(x(j),Y(j)))))$$

$$rxmij=(\tan(Vym(X(i),Y(i)))-\text{Ave}(\tan(Vym(X(i),Y(i)))))/(\tan(vym(x(j),y(j)))-\text{Ave}(\tan(vym(x(j),Y(j))))) \quad (5)$$

$$\sigma ij=1/n\times\Sigma((rxmij-\text{Ave}(rxmij))^2+(rymij-\text{Ave}(rymij))^2) \quad (6)$$

In equations (5) and (6), the change amounts of angles at the coordinates (X(i), Y(i)) on the detection surface of the detection unit 9 are divided by the change amounts of the inclination angles of the reference surface 11a at the coordinates (x(j), y(j)) on the reference surface.

In step S612, coordinate conversion tables are created. Coordinates (x(j), y(j)) on the reference surface at which the variance σij falls within an allowable range, for example, becomes minimum at coordinates (X(i), Y(i)) on the detection surface of the detection unit 9 are obtained. In this case, coordinates on the reference surface at which light incident at given coordinates (X, Y) on the detection surface of the detection unit 9 has been reflected are specified by obtaining the variance of ratios between the change amounts of the inclination angles of the reference surface 11a and the change amounts of angles at coordinates on the detection surface when the reference surface 11a is moved. However, when vxm(x(j), y(j))-Ave(vxm(x(j), y(j))) and vym(x(j), y(j))-Ave (vym(x(j), y(j))) are almost zero, an error becomes large. To prevent this, the variance σij is calculated excluding these values. When obtaining the coordinates (x(j), y(j)) on the reference surface at which the variance σij becomes minimum, not all coordinates (x(j), y(j)) need be searched. A predicted coordinate range on the reference surface may be restricted in advance to search for coordinates (x(j), y(j)) only within this range. When the position of the reference surface 11a that corresponds to the coordinates (X(i), Y(i)) on the detection surface of the detection unit 9 exists between sampled data of (x(j), y(j)), coordinates (x(h), y(h)) on the reference surface that are close to this position may be obtained. Then, data sampling is expanded near the coordinates (x(h), y(h)) on the reference surface by interpolation processing to search for coordinates, as described above. If σij becomes minimum at coordinates (x(k), y(k)) on the reference surface with respect to the coordinates (X(i), Y(i)) on the detection surface of the detection unit 9, the coordinate conversion tables αx(i) and αy(i) are given by equations (7):

$$\alpha x(i)=X(i)/x(k)$$

$$\alpha y(i)=Y(i)/y(k) \quad (7)$$

This processing is performed for all coordinates (X(i), Y(i)) on the detection surface of the detection unit 9, creating the coordinate conversion tables. Coordinates x and y on the measurement target surface are given by equations (8) using the coordinates X and Y on the detection surface of the detection unit 9 and the coordinate conversion tables αx and αy:

$$x=X/\alpha x$$

$$y=Y/\alpha y \quad (8)$$

In step S614, angle conversion tables are created. Letting x(k)=X(i)/αx(i) and y(k)=Y(i)/αy(i) be coordinates on the reference surface that have been obtained by the above-described processing, equations (9) are solved:

$$\beta x(i) = \text{Ave}((Vxm(X(i),Y(i)) - \text{Ave}(Vxm(X(i),Y(i))))/(vxm(x(k),y(k)) - \text{Ave}(vxm(x(k),y(k)))))$$

$$\beta y(i) = \text{Ave}((Vym(X(i),Y(i)) - \text{Ave}(Vym(X(i),Y(i))))/(vym(x(k),y(k)) - \text{Ave}(vym(x(k),y(k)))))$$ (9)

Note that equations (9) are used to calculate the average of ratios between the following two differences (ratios between difference (1) and difference (2)): difference (1): a difference from a value obtained by averaging, for m, the angles Vxm(X(i), Y(i)) and Vym(X(i), Y(i)) of light at the coordinates (X(i), Y(i)) on the detection surface of the detection unit 9 difference (2): a difference from a value obtained by averaging, for m, the inclination angles vxm(x(k), y(k)) and vym(x(k), y(k)) of the reference surface 11a at the coordinates (x(k), y(k)) on the reference surface Instead of solving equations (9), equations (10) may be solved (that is, not the angle difference but the inclination angle difference may be calculated):

$$\beta x(i) = \text{Ave}((\tan(Vxm(X(i),Y(i))) - \text{Ave}(\tan(Vxm(X(i),Y(i)))))/(\tan(vxm(x(k),y(k))) - \text{Ave}(\tan(vxm(x(k),y(k))))))$$

$$\beta y(i) = \text{Ave}((\tan(Vym(X(i),Y(i))) - \text{Ave}(\tan(Vym(X(i),Y(i)))))/(\tan(vym(x(k),y(k))) - \text{Ave}(\tan(vym(x(k),y(k))))))$$ (10)

βx and βy are the ratios between the change amounts of the inclination angles of the reference surface 11a and the change amounts of angles of light at coordinates on the detection surface of the detection unit 9. Equations (9) or (10) are solved for all coordinates (X(i), Y(i)), creating the angle conversion tables βx and βy.

The inclination angles vx and vy of the reference surface 11a are given by equations (11) using the angles Vx and Vy and the angle conversion tables βx and βy:

$$vx - \text{Ave}(vxm) = (Vx - \text{Ave}(Vxm))/\beta x$$

$$vy - \text{Ave}(vym) = (Vy - \text{Ave}(Vym))/\beta y$$ (11)

When the angle conversion tables are created from the inclination angle differences of the reference surface 11a, the inclination angles vx and vy of the reference surface 11a are given by equations (12) using the angles Vx and Vy and the angle conversion tables βx and βy:

$$\tan(vx) - \text{Ave}(\tan(vxm)) = (\tan(Vx) - \text{Ave}(\tan(Vxm)))/\beta x$$

$$\tan(vy) - \text{Ave}(\tan(vym)) = (\tan(Vy) - \text{Ave}(\tan(Vym)))/\beta y$$ (12)

Figure 7:
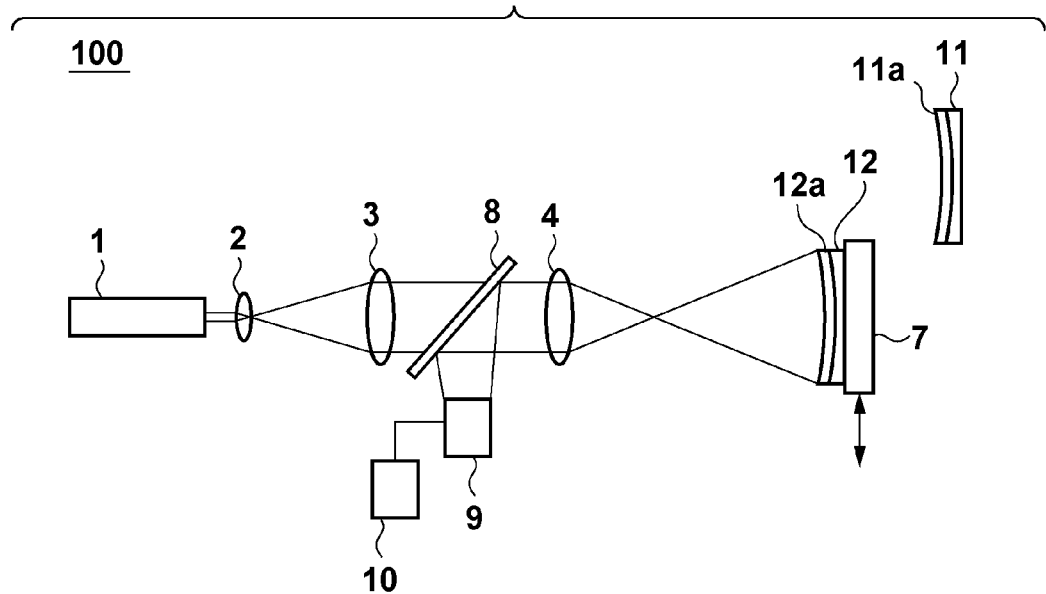
FIG. 7 is a schematic view showing the arrangement of a measurement apparatus according to another aspect of the present invention.

In the embodiment, the surface shape of the measurement target surface 12a is a convex aspherical surface. However, even when the surface shape of the measurement target surface 12a is a concave aspherical surface, the measurement apparatus 100 can measure the surface shape of the measurement target surface 12a at high accuracy. In this case, as shown in FIG. 7, the measurement apparatus 100 suffices to measure the surface shape of the measurement target surface 12a using the reference lens 11 manufactured with the same design values as those of the measurement target lens (that is, the design values of a concave aspherical surface serving as the surface shape of the measurement target surface 12a). More specifically, the measurement target surface 12a is illuminated with divergent light having passed through the lens 4, and the detection unit 9 detects the angle of the light reflected by the measurement target surface 12a. Note that the distance between the lens 4 and the measurement target lens 12 is set so that the center of curvature of a paraxial region on the measurement target surface 12a and the focal point of the lens 4 coincide with each other. Light emitted by the light source 1 almost perpendicularly enters the measurement target surface 12a. The light reflected by the measurement target surface 12a does not diverge (that is, the ray angle does not increase), and enters (the detection surface of) the detection unit 9.

Second Embodiment

The second embodiment is different from the first embodiment in the coordinate conversion table, the angle conversion table, and conversion from an angle at coordinates on the detection surface of a detection unit 9 into an angle at coordinates on a measurement target surface. In particular, the angle is converted by decomposing it not into X and Y components but into the component of a meridional plane and the component of an angle defined by the meridional plane and the X-axis. This enables stricter angle conversion, increasing the measurement accuracy of a measurement apparatus 100.

Figure 3B:
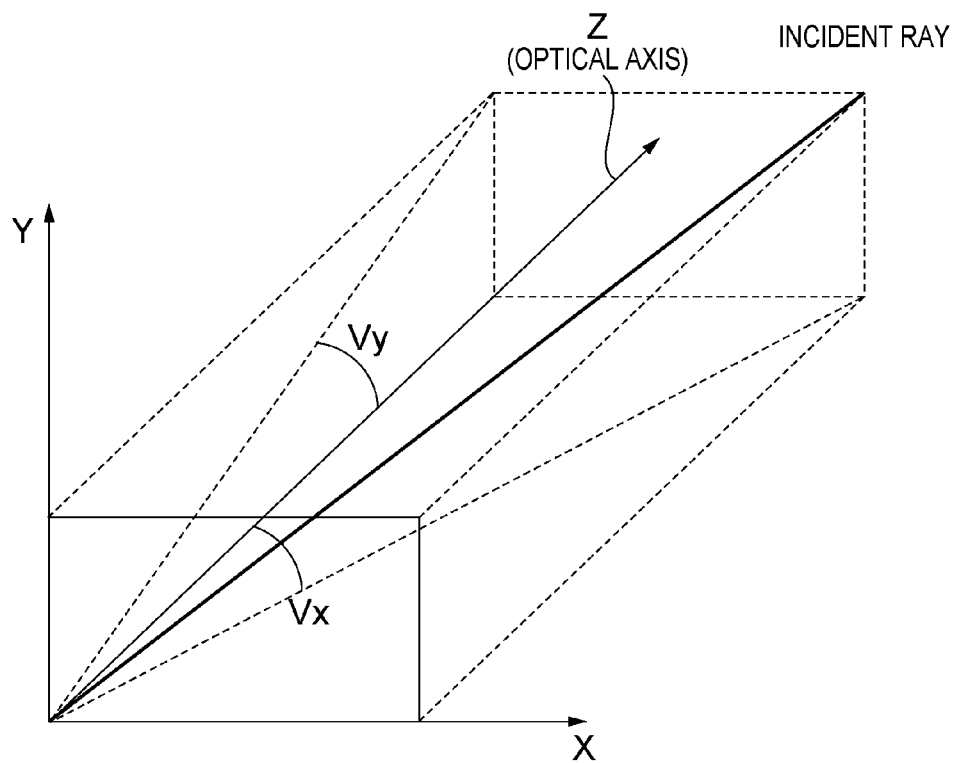
Figure 8:
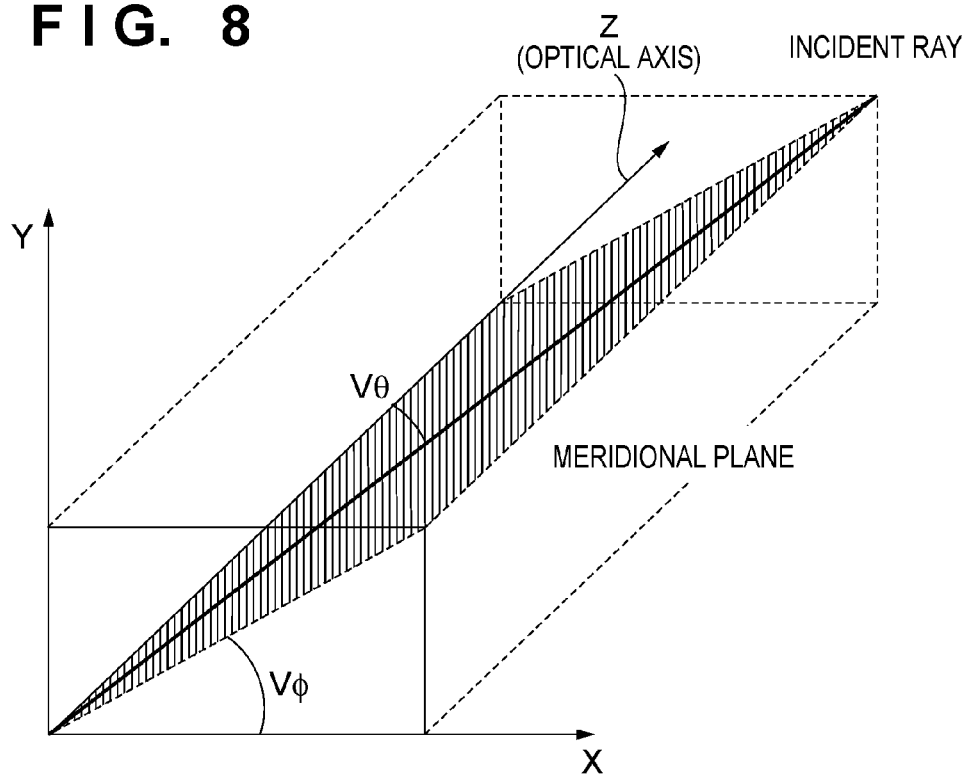
FIG. 8 is a view for explaining an outline of the second embodiment.

In the second embodiment, as shown in FIG. 8, an angle Vθ within the meridional plane and an angle Vφ defined by the meridional plane and the X-axis are obtained according to equations (13) using the angles Vx and Vy shown in FIG. 3B:

$$V\theta = \arctan(\sqrt{\tan^2(Vx) + \tan^2(Vy)})$$

$$V\phi = \arctan(\tan(Vy)/\tan(Vx))$$ (13)

Similarly, as for the inclination angles vx and vy of a reference surface 11a, an angle vθ within the meridional plane and an angle vφ defined by the meridional plane and the X-axis are obtained according to equations (14):

$$v\theta = \arctan(\sqrt{\tan^2(vx) + \tan^2(vy)})$$

$$v\phi = \arctan(\tan(vy)/\tan(vx))$$ (14)

In the second embodiment, the angles Vθ and Vφ are converted into angles vθ and vφ using angle conversion tables.

Figure 9:
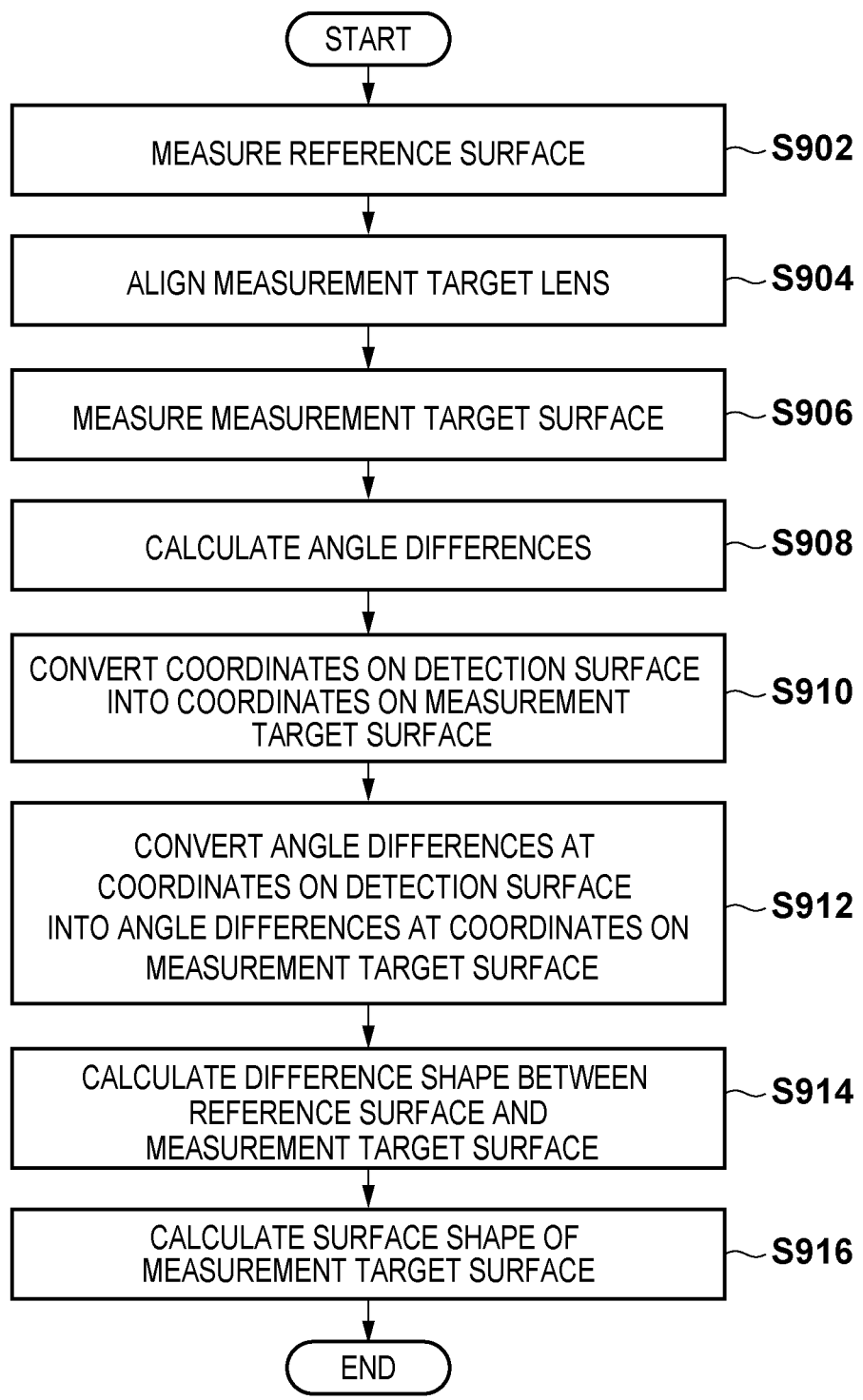
FIG. 9 is a flowchart for explaining measurement processing in the second embodiment.

FIG. 9 is a flowchart for explaining measurement processing by the measurement apparatus 100 in the second embodiment. Referring to FIG. 9, the reference surface 11a is measured in step S902. More specifically, the reference surface 11a having a known aspherical shape is arranged on a plane conjugate to the detection surface of the detection unit 9, and the angles (Vbx, Vby) of light reflected by the reference surface 11a are detected at respective coordinates (X, Y) on the detection surface of the detection unit 9.

In step S904, a measurement target lens 12 is aligned. More specifically, the measurement target lens 12 is arranged in the measurement apparatus 100 in place of a reference lens 11. While the detection unit 9 detects the angle of light reflected by a measurement target surface 12a, the position of the measurement target lens 12 is adjusted to minimize the difference between the angle of light reflected by the measurement target surface 12a and that of light reflected by the reference surface 11a.

In step S906, the measurement target surface 12a is measured. More specifically, the angles (Vsx, Vsy) of light reflected by the measurement target surface 12a are detected at a plurality of coordinates (X, Y) on the detection surface of the detection unit 9.

In step S908, a processing unit 10 calculates angle differences (ΔVθ, ΔVφ)=(Vsθ−Vbθ, Vsφ−Vbφ) between the angles detected in step S902 (angles of light reflected by the reference surface 11a) and the angles detected in step S906

(angles of light reflected by the measurement target surface 12a). The angle differences ΔVθ and ΔVφ can be calculated by obtaining Vbθ, Vbφ, Vsθ, and Vsφ in accordance with equations (13) using the angles Vbx and Vby of light reflected by the reference surface 11a and the angles Vsx and Vsy of light reflected by the measurement target surface 12a.

In step S910, the coordinates (X, Y) on the detection surface of the detection unit 9 are converted into coordinates (x, y) on the measurement target surface by using coordinate conversion tables.

In step S912, the angle differences (ΔVθ, ΔVφ) at the coordinates (X, Y) on the detection surface of the detection unit 9 are converted into angle differences (ΔVθ, Δvφ) at corresponding coordinates (x, y) on the measurement target surface by using angle conversion tables. In this case, Δvφ and ΔVφ may be equal to each other.

In step S914, the processing unit 10 calculates the difference shape between the reference surface 11a and the measurement target surface 12a, that is, the difference shape between the known aspherical shape of the reference surface 11a and the surface shape of the measurement target surface 12a. More specifically, Δvx and Δvy are obtained according to equations (15) using ΔVθ and Δvφ:

$$\Delta vx = \arctan(\tan(\Delta v\theta)\cos(\Delta v\phi))$$

$$\Delta vy = \arctan(\tan(\Delta v\theta)\sin(\Delta v\phi)) \quad (15)$$

Then, the difference shape between the reference surface 11a and the measurement target surface 12a is obtained by integral calculation using the coordinates (x, y) on the measurement target surface and the angle differences (Δvx, Δvy) at the coordinates (x, y) on the measurement target surface.

In step S916, the processing unit 10 calculates the surface shape of the measurement target surface 12a. The surface shape of the measurement target surface 12a can be obtained by adding the difference shape calculated in step S914 to the known aspherical shape of the reference surface 11a.

Figure 10:
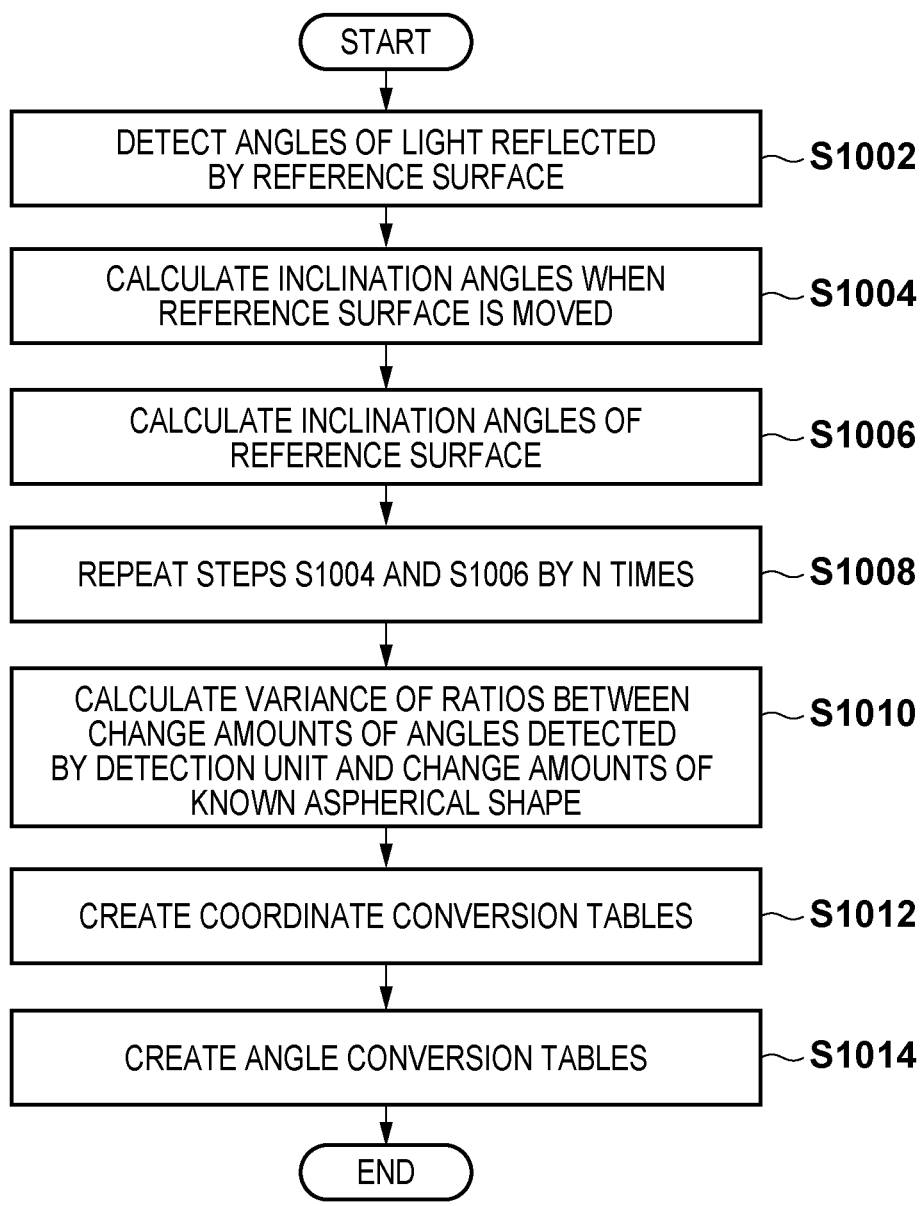
FIG. 10 is a flowchart for explaining creation of a coordinate conversion table used in step S910 of FIG. 9 and an angle conversion table used in step S912.

Creation of the coordinate conversion table used in step S910 and the angle conversion table used in step S912 will be explained with reference to FIG. 10. Note that steps S1002 to S1008 are the same as steps S602 to S608 in the first embodiment (FIG. 6), and a description thereof will not be repeated.

In step S1010, the variance (dispersion) of ratios between change amounts of angles detected by the detection unit 9 before and after positioning the reference surface 11a at respective positions and change amounts of the known aspherical shape before and after moving the reference surface 11a by the known amount is calculated. More specifically, vθm, vφm, Vθm, and Vφm are calculated based on equations (13) and (14) using the angles (Vxm, Vym) of light reflected by the reference surface 11a and the inclination angles vxm and vym of the reference surface 11a. Then, the following equations (16) and (17) are solved using vθm, vφm, Vθm, and Vφm:

$$r\theta mij = (V\theta m(X(i),Y(i)) - \mathrm{Ave}(V\theta m(X(i),Y(i))))/(v\theta m(x(j),y(j)) - \mathrm{Ave}(v\theta m(x(j),y(j))))$$

$$r\phi mij = (V\phi m(X(i),Y(i)) - \mathrm{Ave}(V\phi m(X(i),Y(i))))/(v\phi m(x(j),y(j)) - \mathrm{Ave}(v\phi m(x(j),y(j)))) \quad (16)$$

$$\sigma ij = 1/1/n \times \Sigma((r\theta mij - \mathrm{Ave}(r\theta mij))^2 + (r\phi mij - \mathrm{Ave}(r\phi mij))^2) \quad (17)$$

rθmij and rφmij are values obtained by dividing the change amounts of angles at the coordinates (X(i), Y(i)) on the detection surface of the detection unit 9 by the change amounts of the inclination angles of the reference surface 11a at the coordinates (x(j), y(j)) on the reference surface when the reference surface 11a is moved. σij is the sum of variances of rθmij and rφmij obtained by repeating steps S1004 and S1006 by n times.

In step S1012, coordinate conversion tables are created. Coordinates (x(j), y(j)) on the reference surface at which the variance σij falls within an allowable range, for example, becomes minimum at coordinates (X(i), Y(i)) on the detection surface of the detection unit 9 are obtained. In this case, coordinates on the reference surface at which light incident at given coordinates (X, Y) on the detection surface of the detection unit 9 has been reflected are specified by obtaining the variance of ratios between the change amounts of the inclination angles of the reference surface 11a and the change amounts of angles at coordinates on the detection surface when the reference surface 11a is moved. However, when vθm(x(j), y(j))−Ave(vθm(x(j), y(j))) and vφm(x(j), y(j))−Ave(vφm(x(j), y(j))) are almost zero, an error becomes large. To prevent this, the variance σij is obtained excluding these values. If σij becomes minimum at coordinates (x(k), y(k)) on the reference surface with respect to the coordinates (X(i), Y(i)) on the detection surface of the detection unit 9, the coordinate conversion tables αx(i) and αy(i) are given by equations (18):

$$\alpha x(i) = X(i)/x(k)$$

$$\alpha y(i) = Y(i)/y(k) \quad (18)$$

This processing is performed for all coordinates (X(i), Y(i)) on the detection surface of the detection unit 9, creating the coordinate conversion tables.

In step S1014, angle conversion tables are created. Letting x(k)=X(i)/αx(i) and y(k)=Y(i)/αy(i) be coordinates on the reference surface that have been obtained by the above-described processing, equations (19) are solved:

$$\beta\theta(i) = \mathrm{Ave}((V\theta m(X(i), Y(i)) - \mathrm{Ave}(V\theta m(X(i), Y(i))))/(v\theta m(x(k), y(k)) - \mathrm{Ave}(v\theta m(x(k), y(k)))))$$

$$\beta\phi(i) = \mathrm{Ave}((V\phi m(X(i),Y(i)) - \mathrm{Ave}(V\phi m(X(i),Y(i))))/(v\phi m(x(k),y(k)) - \mathrm{Ave}(v\phi m(x(k),y(k))))) \quad (19)$$

Note that equations (19) are used to calculate the average of ratios between the following two differences (ratios between difference (1) and difference (2)): difference (1): a difference from a value obtained by averaging, for m, the angles Vθm (X(i), Y(i)) and Vφm(X(i), Y(i)) of light at the coordinates (X(i), Y(i)) on the detection surface of the detection unit 9 difference (2): a difference from a value obtained by averaging, for m, the inclination angles vθm(x(k), y(k)) and vφm(x(k), y(k)) of the reference surface 11a at the coordinates (x(k), y(k)) on the reference surface βθ and βφ are the ratios between the change amounts of the inclination angles of the reference surface 11a and the change amounts of angles of light at coordinates on the detection surface of the detection unit 9. Equations (19) are solved for all coordinates (X(i), Y(i)), creating the angle conversion tables βθ and βφ.

The inclination angles vθ and vφ of the reference surface 11a are given by equations (20) using the angles Vθ and Vφ and the angle conversion tables βθ and βφ:

$$v\theta - \mathrm{Ave}(v\theta m) = (V\theta - \mathrm{Ave}(V\theta m))/\beta\theta$$

$$v\phi - \mathrm{Ave}(v\phi) = (V\phi - \mathrm{Ave}(V\phi))/\beta\phi \quad (20)$$

Instead of angle differences, inclination differences or differences between vector components of vectors given by rays having angles detected by the detection unit 9 may be obtained to calculate the angle differences θ and φ from these vector component differences. For φ, βφ≈1, so vφ=Vφ may be set.

As described above, according to the second embodiment, a ray angle is decomposed into the angle component of the meridional plane and the component of an angle defined by the meridional plane and the X-axis, and angle conversion tables are created for the meridional direction and sagittal direction, respectively. An angle at coordinates on the detection surface that is detected by the detection unit 9 can be strictly converted into an angle at coordinates on the measurement target surface. Therefore, the surface shape of the measurement target surface 12*a* can be measured at high accuracy.

Third Embodiment

In the first and second embodiments, the detection surface of the detection unit 9 and the measurement target surface 12*a* are arranged at positions that are conjugate to each other. In practice, however, the positional relationship between the detection surface of the detection unit 9 and the measurement target surface 12*a* may shift from a conjugate positional relationship. The third embodiment will explain particularly a case in which the surface shape of a measurement target surface 12*a* is different from the known aspherical shape of a reference surface 11*a*, the angle of light reflected by the measurement target surface 12*a* changes, and the position of light incident on the detection surface of a detection unit 9 differs from that of light reflected by the reference surface 11*a*.

Figure 11:
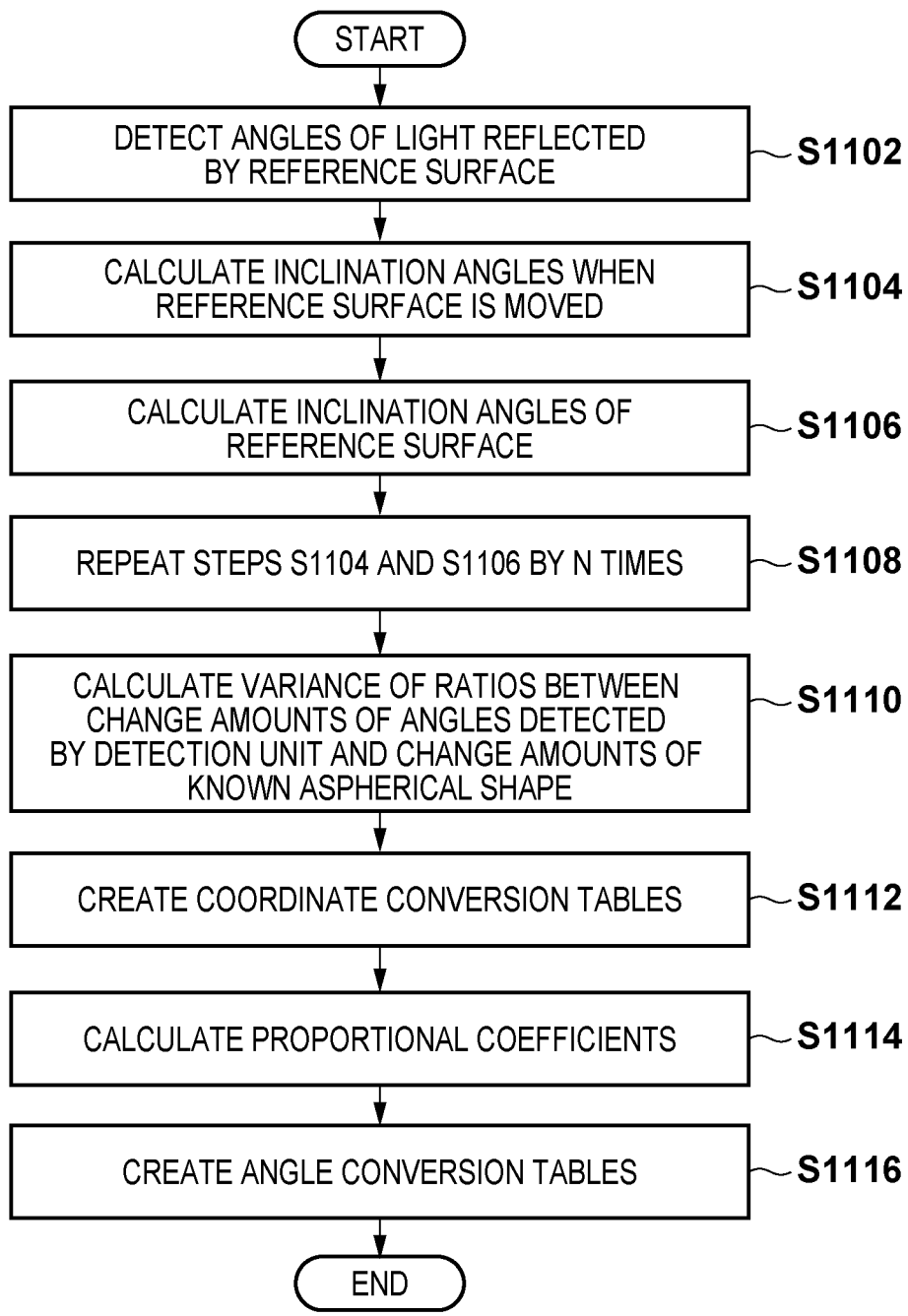
FIG. 11 is a flowchart for explaining creation of a coordinate conversion table and angle conversion table in the third embodiment.

Creation of a coordinate conversion table and angle conversion table will be explained with reference to FIG. 11. Note that steps S1102 to S1112 are the same as steps S602 to S612 in the first embodiment (FIG. 6), and a description thereof will not be repeated. In steps S1102 to S1112, coordinate conversion tables αx and αy are created.

In step S1114, proportional coefficients Fx(i) and Fy(i) are calculated. In this case, the proportional coefficients Fx(i) and Fy(i) are real numbers, and are obtained when the positions (xm, ym) of a ray reflected by the reference surface 11*a* are proportional to the change amounts of angles detected at coordinates (X(i), Y(i)) on the detection surface of the detection unit 9. First, equations (21) and (22) are calculated for all "m"s (1 to n):

$$\delta xm(i)=Fx(i)\times(Vxm(i)-Ave(Vxm(i)))$$

$$\delta ym(i)=Fy(i)\times(Vym(i)-Ave(Vym(i)))$$ (21)

$$xm(i)=X(i)/\alpha x(i)+\delta xm(i)$$

$$ym(i)=Y(i)/\alpha y(i)+\delta ym(i)$$ (22)

Then, equations (23) and (24) are calculated for all "m"s (1 to n):

$$rxm(i)=(Vxm(X(i),Y(i))-Ave(Vxm(X(i),Y(i))))/(vxm(xm(i),ym(i))-Ave(vxm(xm(i),ym(i))))$$

$$rym(i)=(Vym(X(i),Y(i))-Ave(Vym(X(i),Y(i))))/(vym(xm(i),ym(i))-Ave(vym(xm(i),ym(i))))$$

$$\alpha x(i)=1/n\times\Sigma(rxm(i)-Ave(rxm(i)))^2 \quad \alpha y(i)=1/n\times\Sigma(rxm(i)-Ave(rxm(i)))^2$$ (24)

where αx(i) and αy(i) are the variances of rxm(i) and rym(i), respectively.

After that, Fx(i) and Fy(i) which minimize ax(i) and αy(i) are obtained. The above-described processing is executed for all coordinates (X(i), Y(i)) on the detection surface of the detection unit 9, obtaining the proportional coefficients Fx(i) and Fy(i).

In step S1116, angle conversion tables are created. More specifically, equations (21), (22), and (23) are solved using the proportional coefficients Fx(i) and Fy(i). The average values of rxm and rym for m are obtained using equations (25), creating angle conversion tables βhx and βhy:

$$\beta hx=Ave((Vxm(X(i),Y(i))-Ave(Vxm(X(i),Y(i))))/(vxm(xm(i),ym(i))-Ave(vxm(xm(i),ym(i))))$$

$$\beta hy=Ave((Vym(X(i),Y(i))-Ave(Vym(X(i),Y(i))))/(vym(xm(i),ym(i))-Ave(vym(xm(i),ym(i))))$$ (25)

Figure 12:
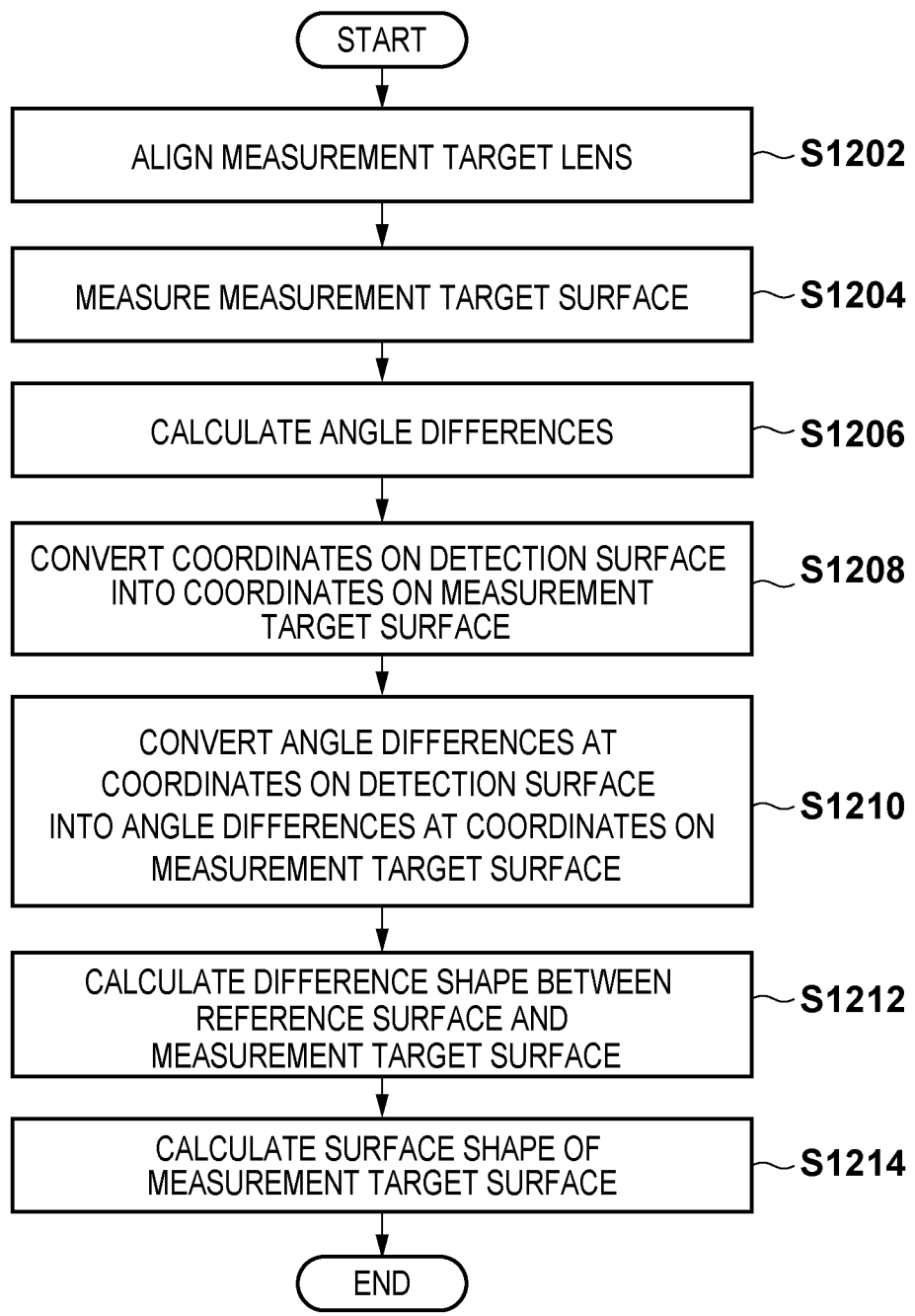
FIG. 12 is a flowchart for explaining measurement processing in the fourth embodiment.

Next, measurement processing by a measurement apparatus 100 in the third embodiment will be described with reference to FIG. 12. In step S1202, a measurement target lens 12 is aligned. More specifically, the measurement target lens 12 is arranged in the measurement apparatus 100. While the detection unit 9 detects angles of light reflected by the measurement target surface 12*a*, the position of the measurement target lens 12 is adjusted to minimize differences between the angles of light reflected by the measurement target surface 12*a* and the averages (Ave(Vxm), Ave(Vym)) of the angles (angle distributions) of light reflected by the reference surface 11*a*.

In step S1204, the measurement target surface 12*a* is measured. More specifically, the angles (Vsx, Vsy) of light reflected by the measurement target surface 12*a* are detected at a plurality of coordinates (X, Y) on the detection surface of the detection unit 9.

In step S1206, a processing unit 10 calculates angle differences (ΔVx, ΔVy)=(Vsx−(Ave(Vxm), Vsy−Ave(Vym)) between the averages of angles of light reflected by the reference surface 11*a* and the angles detected in step S1204 (angles of light reflected by the measurement target surface 12*a*).

In step S1208, the coordinates (X, Y) on the detection surface of the detection unit 9 are converted into coordinates (x, y) on the measurement target surface in accordance with equations (26) using the coordinate conversion tables αx and αy and the proportional coefficients Fx and Fy:

$$x=X/\alpha x+Fx\times\Delta Vx$$

$$y=Y/\alpha y+Fy\times\Delta Vy$$ (26)

In step S1210, the angle differences (ΔVx, ΔVy) at the coordinates (X, Y) on the detection surface of the detection unit 9 are converted into angle differences (Δvx, Δvy) at corresponding coordinates (x, y) on the measurement target surface in accordance with equations (27) using the angle conversion tables βhx and βhy:

$$\Delta vx=\Delta Vx/\beta hx$$

$$\Delta vy=\Delta Vy/\beta hy$$ (27)

Figure 13:
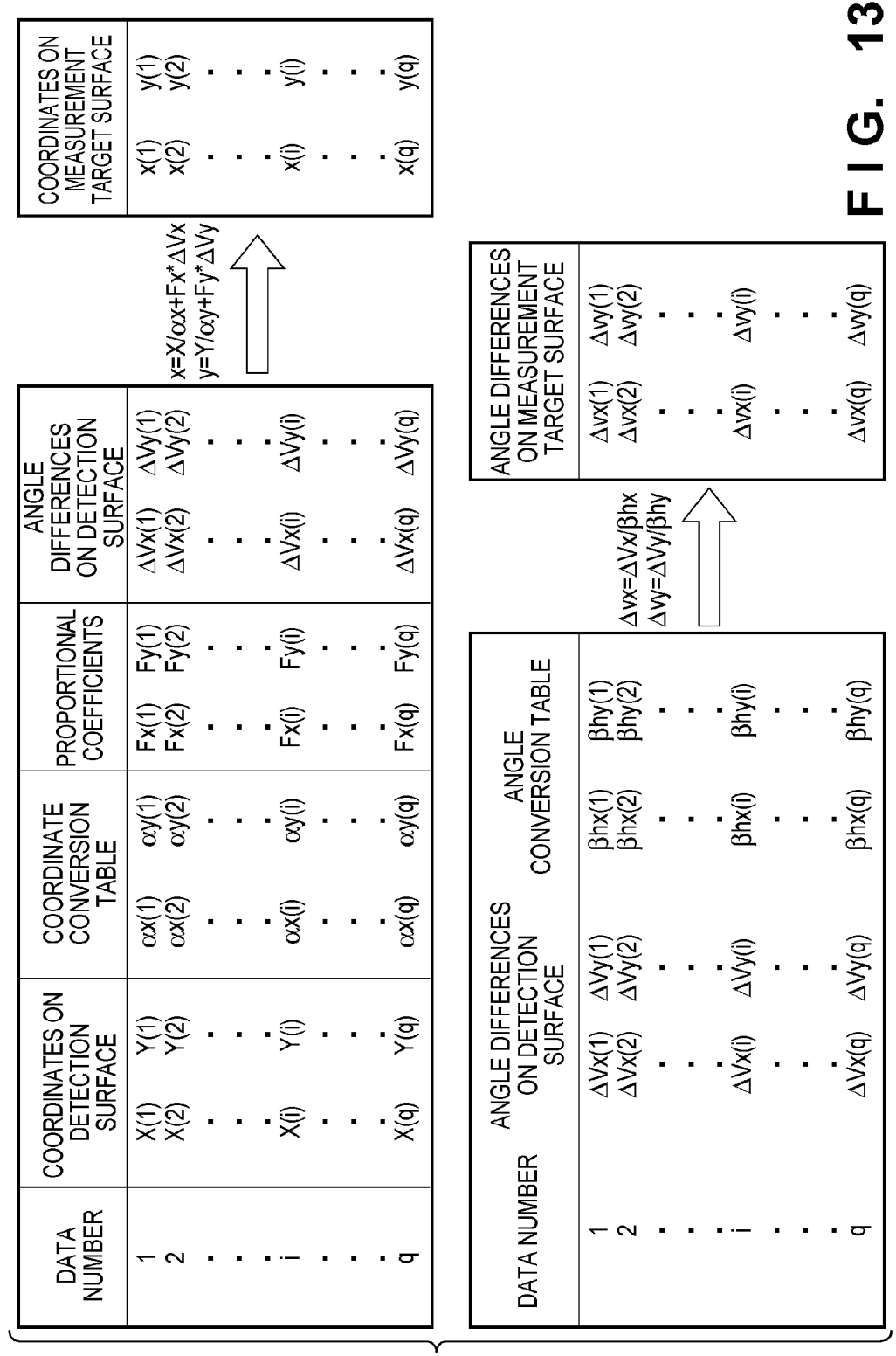
FIG. 13 is a view for explaining a coordinate conversion table, proportional coefficient, and angle conversion table.

FIG. 13 is a view for explaining the coordinate conversion table, proportional coefficient, and angle conversion table. FIG. 13 schematically shows coordinate conversion processing in step S1208 and angle conversion processing in step S1210. Referring to FIG. 13, coordinates (X(i), Y(i)) on the detection surface are converted into coordinates (x(i), y(i)) on the measurement target surface by using the coordinate conversion tables αx(i) and αy(i) and the proportional coefficients Fx(i) and Fy(i). Also, angle differences (ΔVx(i), ΔVy(i)) at the coordinates (X(i), Y(i)) on the detection surface are converted into angle differences (Δvx(i), Δvy(i)) at the coordinates (x(i), y(i)) on the measurement target surface by using the angle conversion tables βhx(i) and βhy(i).

In step S1212, the processing unit 10 calculates the difference shape between the reference surface 11a and the measurement target surface 12a. The difference shape between the reference surface 11a and the measurement target surface 12a can be obtained by integral calculation using the coordinates (x, y) on the measurement target surface and the angle differences (Δvx, Δvy) at the coordinates (x, y) on the measurement target surface. In this case, the difference shape between the average value of the shape of the reference surface 11a when the reference surface 11a is moved to create coordinate conversion tables and angle conversion tables, and the measurement target surface 12a is obtained.

In step S1214, the processing unit 10 calculates the surface shape of the measurement target surface 12a. The surface shape of the measurement target surface 12a can be obtained by adding the difference shape calculated in step S1212 to the average value of the shape of the reference surface 11a when the reference surface 11a is moved to create coordinate conversion tables and angle conversion tables.

As described above, according to the third embodiment, when the positional relationship between the detection surface of the detection unit 9 and the measurement target surface 12a shifts from a conjugate positional relationship, proportional coefficients when the positions of a ray reflected by the reference surface 11a are proportional to the change amounts of angles detected at coordinates on the detection surface of the detection unit 9 are obtained. Hence, even when the angle of light reflected by the measurement target surface 12a changes and the position of light incident on the detection surface of the detection unit 9 differs from that of light reflected by the reference surface 11a, coordinates on the detection surface can be converted at high accuracy into coordinates on the measurement target surface by using the proportional coefficients and coordinate conversion tables. The measurement apparatus 100 can therefore measure the surface shape of the measurement target surface 12a at high accuracy.

Fourth Embodiment

The fourth embodiment will describe a method of obtaining a coordinate conversion table and angle conversion table by ray trace. This method obviates the need to position a reference lens 11 (reference surface 11a) at a plurality of positions and measure the reference surface 11a at the respective positions. Thus, the surface shape of a measurement target surface 12a can be measured more easily.

Creation of a coordinate conversion table and angle conversion table in the fourth embodiment will be explained with reference to FIG. 14. In step S1402, the parameters of optical data of a measurement apparatus 100 are input to a ray trace program. The optical data of the measurement apparatus 100 include, for example, lens data (for example, curvature radius, effective diameter, and layout position), data (for example, the design value of the aspherical shape) of the reference lens 11, and data (for example, the size of the detection surface and the size of the microlens) of a detection unit 9. Assume that the ray trace program is installed in a processing unit 10. Alternatively, an external information processing apparatus in which the ray trace program is installed may be connected to a measurement apparatus 100 to input the result of ray trace to the measurement apparatus 100.

In step S1404, ray trace is performed based on the parameters input in step S1402. More specifically, ray trace is done for light which is emitted by a light source 1, impinges on the reference surface 11a via lenses 4, 5, and 6, is reflected by the reference surface 11a, and enters the detection unit 9 via the lenses 6, 5, and 4 (is detected on the detection surface of the detection unit 9).

In step S1406, inclination angles (vx, vy) at coordinates (x, y) on the reference surface are calculated using equations (2).

In step S1408, the coordinates and angles of light which has been reflected by the reference surface 11a and enters the detection surface of the detection unit 9 are calculated. More specifically, coordinates (X, Y) corresponding to a position where light reflected at the coordinates (x, y) on the reference surface impinges on the detection surface of the detection unit 9, and the angles (Vx, Vy) of light at the coordinates (X, Y) that has been reflected at the coordinates (x, y) on the reference surface are calculated.

In step S1410, inclination angles (vxt, vyt) at the coordinates (x, y) when the reference surface 11a is moved are calculated using equations (2).

In step S1412, the coordinates and angles of light which has been reflected by the reference surface 11a and enters the detection surface of the detection unit 9 when the reference surface 11a is moved are calculated. More specifically, coordinates (Xt, Yt) corresponding to a position where light reflected at the coordinates (x, y) on the reference surface when the reference surface 11a is moved impinges on the detection surface of the detection unit 9 are calculated. Also, the angles (Vxt, Vyt) of light at the coordinates (Xt, Yt) on the detection surface that has been reflected at the coordinates (x, y) on the reference surface are calculated.

In step S1414, interpolation calculation is executed to interpolate the angles of light reflected by the reference surface 11a at coordinates on the detection surface. More specifically, interpolation calculation is done for the angles (Vxt, Vyt) at the coordinates (Xt, Yt) on the detection surface, obtaining angles (Vxtt, Vytt) at coordinates (X, Y) corresponding to a position where light reflected by the reference surface 11a enters the detection surface.

In step S1416, coordinate conversion tables are created. More specifically, coordinate conversion tables αx and αy are created by solving equations (28):

$$\alpha x = X/x$$
$$\alpha y = Y/y \tag{28}$$

In step S1418, angle conversion tables are created. More specifically, angle conversion tables βx and βy are created by solving equations (29):

$$\beta x = (Vxtt-Vx)/(vxt-vx)$$
$$\beta y = (Vytt-Vy)/(vyt-vy) \tag{29}$$

Note that the difference between angles may be regarded as the difference between inclinations or a vector. In this case, the difference between the x and y components of vectors may be obtained to calculate angles in the x and y directions.

In this manner, the coordinate conversion tables and angle conversion tables may be created by ray trace, instead of actually detecting light reflected by the reference surface 11a by the detection unit 9. Even when the coordinate conversion tables and angle conversion tables are created by ray trace, measurement processing by the measurement apparatus 100 is the same as that described above, and a description thereof will not be repeated.

Fifth Embodiment

The fifth embodiment will explain measurement processing when the positional relationship between the detection surface of a detection unit 9 and a measurement target surface 12a shifts from a conjugate positional relationship. FIG. 15 is a schematic view exemplifying the positional relationship between the position of a plane conjugate to the detection surface of the detection unit 9 and the position of a measurement target surface 12a (reference surface 11a). Referring to FIG. 15, the position of the plane conjugate to the detection surface of the detection unit 9 and the position of the measurement target surface 12a (reference surface 11a) do not coincide with each other. In this case, coordinates and angles on the detection surface of the detection unit 9 are converted into coordinates and angles on the plane conjugate to the detection surface by using coordinate conversion tables and angle conversion tables which are created by ray trace. Ray trace is executed up to the reference surface 11a using the coordinates and angles on the plane conjugate to the detection surface, obtaining coordinates and angles on the measurement target surface (reference surface). Thus, even if the positional relationship between the detection surface of the detection unit 9 and the measurement target surface 12a shifts from a conjugate positional relationship, as shown in FIG. 15, the surface shape of the measurement target surface 12a can be measured at high accuracy.

Creation of a coordinate conversion table and angle conversion table in the fifth embodiment will be explained with reference to FIG. 16. In step S1602, the parameters of optical data (for example, lens data, data of a reference lens 11, and data of the detection unit 9) of a measurement apparatus 100 are input to a ray trace program.

In step S1604, ray trace is performed based on the parameters input in step S1602. More specifically, ray trace is done for light which is emitted by a light source 1, impinges on the reference surface 11a via lenses 4, 5, and 6, is reflected by the reference surface 11a, and enters the detection unit 9 via the lenses 6, 5, and 4 (is detected on the detection surface of the detection unit 9).

In step S1606, the coordinates (xc, yc) of light reflected at coordinates (x, y) on the reference surface that correspond to an incident position on the plane conjugate to the detection surface of the detection unit 9, and angles (vxc, vyc) at the coordinates (xc, yc) of light reflected at the coordinates (x, y) on the reference surface are calculated.

In step S1608, the coordinates and angles of light which has been reflected by the reference surface 11a and enters the detection surface of the detection unit 9 are calculated. More specifically, coordinates (X, Y) corresponding to a position where light reflected at the coordinates (x, y) on the reference surface impinges on the detection surface of the detection unit 9, and the angles (Vx, Vy) of light at the coordinates (X, Y) that has been reflected at the coordinates (x, y) on the reference surface are calculated.

In step S1610, the coordinates and angles of light which has been reflected by the reference surface 11a and enters the plane conjugate to the detection surface of the detection unit 9 when the reference surface 11a is moved are calculated. More specifically, coordinates (xcc, ycc) corresponding to a position where light reflected at the coordinates (x, y) on the reference surface when the reference surface 11a is moved enters the plane conjugate to the detection surface of the detection unit 9 are calculated. In addition, the angles (vxcc, vycc) of light at coordinates (Xcc, Ycc) on the plane conjugate to the detection surface that has been reflected at the coordinates (x, y) on the reference surface are calculated.

In step S1612, the coordinates and angles of light which has been reflected by the reference surface 11a and enters the detection surface of the detection unit 9 when the reference surface 11a is moved are calculated. More specifically, coordinates (Xt, Yt) corresponding to a position where light reflected at the coordinates (x, y) on the reference surface when the reference surface 11a is moved impinges on the detection surface of the detection unit 9 are calculated. Also, the angles (Vxt, Vyt) of light at the coordinates (Xt, Yt) on the detection surface that has been reflected at the coordinates (x, y) on the reference surface are calculated.

In step S1614, interpolation calculation is performed to interpolate the angles of light reflected by the reference surface 11a at coordinates on the plane conjugate to the detection surface of the detection unit 9. More specifically, interpolation calculation is executed for the angles (vxcc, vycc) at the coordinates (xcc, ycc) on the plane conjugate to the detection surface of the detection unit 9. As a result, angles (vxccc, vyccc) at the coordinates (xc, yc) corresponding to a position where light reflected by the reference surface 11a enters the conjugate plane are obtained.

In step S1616, interpolation calculation is performed to interpolate the angles of light reflected by the reference surface 11a at coordinates on the detection surface. More specifically, interpolation calculation is done for the angles (Vxt, Vyt) at the coordinates (Xt, Yt) on the detection surface, obtaining angles (Vxtt, Vytt) at coordinates (X, Y) corresponding to a position where light reflected by the reference surface 11a impinges on the detection surface.

In step S1618, coordinate conversion tables are created. More specifically, coordinate conversion tables αx and αy are created by solving equations (30):

$$\alpha x = X/xc$$

$$\alpha y = Y/yc \tag{30}$$

In step S1620, angle conversion tables are created. More specifically, angle conversion tables βx and βy are created by solving equations (31):

$$\beta x = (Vxtt - Vx)/(vxccc - vxc)$$

$$\beta y = (Vytt - Vy)/(vyccc - vyc) \tag{31}$$

Note that the difference between angles may be regarded as the difference between inclinations, or the ray may be regarded as a vector. In this case, the differences between the x, y, and z components of vectors are obtained to calculate angles in the x and y directions.

Measurement processing by the measurement apparatus 100 in the fifth embodiment will be described with reference to FIG. 17. In step S1702, the reference surface 11a is measured. More specifically, the reference lens 11 is arranged in the measurement apparatus 100, and the angles (Vbx, Vby) of light reflected by the reference surface 11a are detected at respective coordinates (X, Y) on the detection surface of the detection unit 9.

In step S1704, a measurement target lens 12 is aligned. More specifically, the measurement target lens 12 is arranged in the measurement apparatus 100 in place of the reference lens 11. While the detection unit 9 detects the angle of light reflected by the measurement target surface 12a, the position of the measurement target lens 12 is adjusted to minimize the difference between the angle of light reflected by the measurement target surface 12a and that of light reflected by the reference surface 11a.

In step S1706, the measurement target surface 12a is measured. More specifically, the angles (Vsx, Vsy) of light reflected by the measurement target surface 12a are detected at a plurality of coordinates (X, Y) on the detection surface of the detection unit 9.

In step S1708, the coordinates (X, Y) on the detection surface of the detection unit 9 are converted into coordinates (xc, yc) on the plane conjugate to the detection surface by using the coordinate conversion tables αx and αy.

In step S1710, angles at the coordinates (X, Y) on the detection surface of the detection unit 9 are converted into angles at corresponding coordinates (xc, yc) on the plane conjugate to the detection surface by using the angle conversion tables βx and βy. More specifically, the angles Vbx, Vby, Vsx, and Vsy at the coordinates (X, Y) are converted into angles vbxc, vbyc, vsxc, and vsyc at the coordinates (xc, yc) according to equations (32):

$$vbxc = vxc + Vbx/\beta x$$

$$vbyc = vyc + Vby/\beta y$$

$$vsxc = vxc + Vsx/\beta x$$

$$vsyc = vyc + Vsy/\beta y \quad (32)$$

In step S1712, ray trace is performed from the plane conjugated to the detection surface of the detection unit 9 up to the reference surface 11a. Coordinates (xb, yb) and (xs, ys) crossing the reference surface 11a are obtained using the angles (vbxc, vbyc) of light reflected by the reference surface 11a and the angles (vsxc, vsyc) of light reflected by the measurement target surface 12a at the coordinates (xc, yc) on the plane conjugate to the detection surface.

In step S1714, interpolation calculation is performed for the angles (vsxc, vsyc) at the coordinates (xs, ys) on the reference surface, calculating angles (vsbxc, vsbyc) at the coordinates (xb, yb) on the reference surface.

In step S1716, a processing unit 10 calculates angle differences (Δvx, Δvy) in accordance with equations (33):

$$\Delta vx = vsbxc - vbxc$$

$$\Delta vy = vsbyc - vbyc \quad (33)$$

In step S1718, the processing unit 10 calculates the difference shape between the reference surface 11a and the measurement target surface 12a, that is, the difference shape between the known aspherical shape of the reference surface 11a and the surface shape of the measurement target surface 12a. The difference shape between the reference surface 11a and the measurement target surface 12a can be obtained by integral calculation using the coordinates (xb, yb) on the reference surface and the angle differences (Δvx, Δvy).

In step S1720, the processing unit 10 calculates the surface shape of the measurement target surface 12a. The surface shape of the measurement target surface 12a can be obtained by adding the difference shape calculated in step S1718 to the known aspherical shape of the reference surface 11a.

As described above, according to the fifth embodiment, coordinates and angles on the detection surface of the detection unit 9 are converted into coordinates and angles on a plane conjugate to the detection surface, and ray trace is performed up to the reference surface 11a using the coordinates and angles. Even when the positional relationship between the detection surface of the detection unit 9 and the measurement target surface 12a shifts from a conjugate positional relationship, the surface shape of the measurement target surface 12a can be measured at high accuracy.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent application No. 2010-282395, filed on Dec. 17, 2010, which is hereby incorporated by reference herein in its entirety.

What is claimed is:

1. A measurement method of measuring a surface shape of a measurement target surface using a measurement apparatus including a first optical system that illuminates the measurement target surface including an aspherical surface using light emitted by a light source, and a second optical system that guides the light traveling from the measurement target surface to a detection unit having a detection surface, the method comprising:

a first step of arranging a reference surface having a known aspherical shape on a plane conjugate to the detection surface, and detecting, with the detection unit at each coordinate in a coordinate system having a predetermined number of coordinates defined on the detection surface, angles of light traveling from the reference surface at which the light enters the detection surface;

a second step of arranging the measurement target surface on the conjugate plane and detecting, with the detection unit at each of the coordinates in the coordinate system defined on the detection surface, angles of light traveling from the measurement target surface at which the light enters the detection surface;

a third step of converting coordinates in the coordinate system defined on the detection surface that indicate positions where light traveling from the measurement target surface enters the detection surface into coordinates in a coordinate system defined on the measurement target surface;

a fourth step of converting angle differences between the angles detected in the first step and the angles detected in the second step at each of the coordinates in the coordinates system defined on the detection surface into angle differences at each of a plurality of coordinates in the coordinate system defined on the measurement target surface that correspond to each of the coordinates in the coordinate system defined on the detection surface; and a fifth step of obtaining a difference shape between the surface shape of the measurement target surface and the known aspherical shape by integral calculation using the coordinates in the coordinate system defined on the measurement target surface that have been converted in the third step and the angle differences at the plurality of coordinates in the coordinate system defined on the measurement target surface that have been converted in the fourth step, and adding the difference shape to the known aspherical shape to calculate the surface shape of the measurement target surface.

2. The method according to claim 1, further comprising:

a step of creating a coordinate conversion table used for converting in the third step, wherein the step of creating the coordinate conversion table includes the steps of:

positioning the reference surface at each of positions shifted or tilted in a direction orthogonal or parallel to the conjugate plane by a known amount and detecting, with the detection unit at each of the coordinates in the coordinate system defined on the detection surface, angles of light traveling from the reference surface at each of the positions at which the light enters the detection surface; and obtaining, at each of the coordinates in the coordinate system defined on the detection surface, coordinates in the coordinate system defined on the measurement target surface at which a variance of ratios between change amounts of angles detected by the detection unit before and after positioning the reference surface at each of the positions and change amounts of an inclination angle of the known aspherical shape before and after shifting or tilting the reference surface by the known amount falls within an allowable range, and specifying, as the coordinates in the coordinate system defined on the detection surface that indicate positions where light traveling from the measurement target surface enters the detection surface, the coordinates in the coordinate system defined on the measurement target surface at which the variance of ratios falls within the allowable range.

3. The method according to claim 1, further comprising:
a step of creating an angle conversion table used for converting in the fourth step,
wherein the step of creating the angle conversion table includes the steps of:
positioning the reference surface at each of positions shifted or tilted in a direction orthogonal or parallel to the conjugate plane by a known amount and detecting, with the detection unit at each of the coordinates in the coordinate system defined on the detection surface, angles of light traveling from the reference surface at each of the positions at which the light enters the detection surface;
converting, using the coordinate conversion table, coordinates in the coordinate system defined on the detection surface that indicate positions where light traveling from the reference surface enters the detection surface into coordinates in the coordinate system defined on the reference surface; and
obtaining ratios between change amounts of angles detected by the detection unit before and after positioning the reference surface at each of the positions and double amounts of change amounts of an inclination angle of the known aspherical shape at the converted coordinates in the coordinate system defined on the reference surface before and after shifting or tilting the reference surface by the known amount, and generating the angle conversion table based on the ratios.

4. The method according to claim 1, further comprising:
a step of creating an angle conversion table used for converting in the fourth step,
wherein the angle conversion table is created for each of a component of a meridional plane of light traveling from the reference surface and enters the detection surface and a component of an angle defined by the meridional plane and a direction orthogonal to an optical axis of the reference surface.

5. The method according to claim 1, further comprising:
a step of creating a coordinate conversion table used for converting in the third step; and
a step of obtaining proportional coefficients when a position of light traveling from the reference surface on the reference surface changes in proportion to the angle differences between the angles detected in the first step and the angles detected in the second step,
wherein the third step converts, using the coordinate conversion table and the proportional coefficients, coordinates in the coordinate system defined on the detection surface that indicate positions where light traveling from the measurement target surface enters the detection surface into coordinates in the coordinate system defined on the measurement target surface.

6. The method according to claim 1, further comprising:
a step of creating a coordinate conversion table used for converting in the third step,
wherein the step of creating the coordinate conversion table includes the steps of:
when the reference surface is positioned at each of positions shifted or tilted in a direction orthogonal or parallel to the conjugate plane by a known amount, obtaining, by ray trace at each of the coordinates in the coordinate system defined on the detection surface, angles of light traveling from the reference surface at each of the positions at which the light enters the detection surface; and
obtaining, at each of the coordinates in the coordinate system defined on the detection surface, coordinates in the coordinate system defined on the measurement target surface at which a variance of ratios between change amounts of angles obtained by the ray trace before and after positioning the reference surface at each of the positions and change amounts of an inclination angle of the known aspherical shape before and after shifting or tilting the reference surface by the known amount falls within an allowable range, and specifying, as the coordinates in the coordinate system defined on the detection surface that indicate positions where light traveling from the measurement target surface enters the detection surface, the coordinates in the coordinate system defined on the measurement target surface at which the variance of ratios falls within the allowable range.

7. The method according to claim 1, further comprising:
a step of creating a coordinate conversion table used for converting in the third step; and
a step of creating an angle conversion table used for converting in the fourth step,
wherein the step of creating the angle conversion table includes the steps of:
when the reference surface is positioned at each of positions shifted or tilted in a direction orthogonal or parallel to the conjugate plane by a known amount, obtaining, by ray trace at each of coordinates in the coordinate system defined on the detection surface, angles of light traveling from the reference surface at each of the positions at which the light enters the detection surface;
converting, using the coordinate conversion table, coordinates in the coordinate system defined on the detection surface that indicate positions where light traveling from the reference surface enters the detection surface into coordinates in the coordinate system defined on the reference surface; and
obtaining ratios between change amounts of angles obtained by the ray trace before and after positioning the reference surface at each of the positions and double amounts of change amounts of an inclination angle of the known aspherical shape at the converted coordinates in the coordinates system defined on the reference surface before and after shifting or tilting the reference surface by the known amount at the converted coordinates on the reference surface in the coordinate system defined on the reference surface, and generating the angle conversion table based on the ratios.

8. The method according to claim 1, further comprising the steps of:
creating a coordinate conversion table used for converting in the third step;
creating an angle conversion table used for converting in the fourth step;
obtaining coordinates in the coordinate system defined on the plane conjugate to the detection surface using the coordinate conversion table from coordinates in the coordinate system defined on the detection surface that indicate positions where light traveling from each of the reference surface and the measurement target surface enters the detection surface;

obtaining, using the angle conversion table, angles on the plane conjugate to the detection surface from each of the angles detected in the first step and the angles detected in the second step; and obtaining, by ray trance, coordinates in the coordinate system defined on the reference surface that cross the reference surface from the obtained coordinates in the coordinate system defined on the plane conjugate to the detection surface and the obtained angles on the plane conjugate to the detection surface.

9. The method according to claim 1, wherein the detection unit includes a Shack-Hartmann sensor.

10. A measurement apparatus for measuring a surface shape of a measurement target surface including an aspherical surface, the measurement apparatus comprising:

a first optical system configured to illuminate the measurement target surface using light emitted by a light source;

a second optical system configured to guide the light traveling from the measurement target surface to a detection unit having a detection surface; and a processing unit configured to perform processing for obtaining the surface shape of the measurement target surface based on a result of detection by the detection unit, wherein the processing unit is programmed to execute:

a first task that arranges a reference surface having a known aspherical shape on a plane conjugate to the detection surface and detects, with the detection unit at each coordinate in a coordinate system having a predetermined number of coordinates defined on the detection surface, angles of light traveling from the reference surface at which the light enters the detection surface;

a second task that arranges the measurement target surface on the conjugate plane and detects, using the detection unit at each of the coordinates in the coordinate system defined on the detection surface, angles of light traveling from the measurement target surface at which the light enters the detection surface;

a third task that converts coordinates in the coordinate system defined on the detection surface that indicate positions where light traveling from the measurement target surface enters the detection surface into coordinates in a coordinate system defined on the measurement target surface;

a fourth task that converts angle differences between the angles detected in the first task and the angles detected in the second task at each of the coordinates in the coordinate system defined on the detection surface into angle differences at each of a plurality of coordinates in the coordinate system defined on the measurement target surface that correspond to each of the coordinates in the coordinate system defined on the detection surface; and a fifth task that obtains a difference shape between the surface shape of the measurement target surface and the known aspherical shape by integral calculation using the coordinates in the coordinate system defined on the measurement target surface that have been converted in the third task and the angle differences at the plurality of coordinates in the coordinate system defined on the measurement target surface that have been converted in the fourth task, and adds the difference shape to the known aspherical shape to calculate the surface shape of the measurement target surface.

* * * * *